US006628367B2

(12) United States Patent
Hirabayashi et al.

(10) Patent No.: US 6,628,367 B2
(45) Date of Patent: Sep. 30, 2003

(54) METHOD FOR MANUFACTURING ELECTROOPTICAL DEVICE, AND ELECTROOPTICAL DEVICE

(75) Inventors: Yukiya Hirabayashi, Suwa (JP); Yasushi Yamazaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/877,000

(22) Filed: Jun. 11, 2001

(65) Prior Publication Data

US 2002/0021402 A1 Feb. 21, 2002

(30) Foreign Application Priority Data

Jul. 28, 2000 (JP) ........................................ 2000-229452

(51) Int. Cl.[7] ............................................. G02F 1/1333
(52) U.S. Cl. ..................... 349/187; 349/156; 349/42; 349/43; 349/155
(58) Field of Search ..................... 349/187, 43, 42, 349/156, 155

(56) References Cited

U.S. PATENT DOCUMENTS 6,072,557 A * 6/2000 Kishimoto .................. 349/156

6,403,395 B2 * 6/2002 Hirabayashi et al. ......... 438/69

FOREIGN PATENT DOCUMENTS

| JP | 3-125123 A | 5/1991 |
| JP | 3-52611 B2 | 8/1991 |
| JP | 8-171101 A | 7/1996 |
| JP | 9-127497 A | 5/1997 |

* cited by examiner

*Primary Examiner*—Toan Ton
*Assistant Examiner*—Thoi V. Duong
(74) *Attorney, Agent, or Firm*—Oliff & Berridge, PLC

(57) ABSTRACT

The invention provides an electrooptical device, such as a liquid-crystal device that presents a high-contrast, bright and high-quality image, by reducing a malfunction due to a transverse electric field in an electrooptical material, such as a liquid crystal. The electrooptical device includes pixel electrodes on a TFT array substrate and a counter electrode on a counter substrate. Arranged beneath the pixel electrodes in the TFT array substrate are protrusions in an area facing a spacing between adjacent pixel electrodes. The method for manufacturing such an electrooptical device includes: forming a pattern including a wiring, a TFT, etc. on the TFT array substrate; planarizing the surface of a laminate of the substrate including the pattern; and forming the protrusion by subjecting the planarized surface to photolithographic and etching processes.

17 Claims, 12 Drawing Sheets

METHOD FOR MANUFACTURING ELECTROOPTICAL DEVICE, AND ELECTROOPTICAL DEVICE

BACKGROUND OF THE INVENTION

1. Field of Invention

The present invention relates to the technical field of an electrooptic device such as a liquid-crystal device, and more particularly, to a thin-film transistor (hereinafter referred as TFT) and an active-matrix liquid-crystal display device, which adopts an alternating drive method in which the polarities of the voltages applied to adjacent pixels are periodically alternated in every pixel row or every pixel column so that the voltages applied to adjacent pixels in a row direction or in a column direction are inverted in polarity.

2. Description of Related Art

The electrooptic device of this sort typically adopts an alternating drive method in which the polarity of a voltage applied to the pixel electrodes is alternated at a predetermined pattern to prevent degradation of the electrooptic material, as a result of the application of a direct current, and to control a cross-talk and flickering of a display screen image. A 1H alternating drive method is relatively easy to control and presents a high-quality image display, wherein during the presentation of a video signal of one frame or one field, the pixel electrodes arranged on an odd row are driven by a voltage that is positive relative to the potential of a counter electrode, while the pixel electrodes arranged on an even row are driven by a voltage that is negative relative to the potential of the counter electrode, and during the presentation of a video signal of a next frame or a next field, conversely, the pixel electrodes arranged on the even row are driven by a positive voltage while the pixel electrodes arranged on the odd row are driven by a negative voltage (in other words, the pixel electrodes on the same row are driven by the same polarity voltage and the voltage polarity is alternated every row with the period of frame or field).

A 1S alternating drive method is also easy to control and presents a high-quality image display, wherein the pixel electrodes on the same column are driven by the same polarity voltage, while the voltage polarity is alternated every column with the period of frame or field.

Further, a dot alternating drive method has been developed which periodically reverses the polarity of the voltage applied to each pixel electrode from pixel electrode to pixel electrode in the direction of columns or in the direction of rows.

SUMMARY OF THE INVENTION

When the voltages of the adjacent pixel electrodes in a TFT array substrate (i.e., the voltages applied to the pixel electrodes adjacent in the column direction in the 1H alternating drive method, the voltages applied to the pixel electrodes adjacent in the row direction in the 1S alternating drive method, and the voltages applied to the pixel electrodes adjacent in the row direction and the column direction in the dot alternating drive method) are opposite in polarity as in the above-referenced 1H alternating drive method, the 1S alternating drive method, and the dot alternating drive method, a transverse electric field (specifically, an electric field in parallel with the surface of the substrate or an slant electric field having a component in parallel with the surface of the substrate) takes place between the adjacent pixel electrodes. If such a transverse electric field is applied to the electrooptic material, which is expected to work under a longitudinal electric field present between the pixel electrodes and the counter electrode (i.e., an electric field perpendicular to the surface of the substrate), an orientation defect takes place in the electrooptic material, an unlit defect occurs there, and the contrast ratio drops. Although the area of the transverse electric field can be covered with the light shield layer, the aperture of the pixel is reduced with the size of the area of the transverse electric field. As the distance between the adjacent pixel electrodes is reduced with a fine pixel pitch, the transverse electric field intensifies, and these become more problematic as high-definition design increases in the electrooptic device.

The present invention has been developed in view of the above problems, and it is an object of the present invention to provide a method for manufacturing an electrooptical device and the electrooptical device which reduces a malfunction due to the transverse electric field in the electrooptical material, such as a liquid crystal, while presenting a high-contrast, bright and high-quality image.

To achieve the above object, in accordance with the invention, a method for manufacturing an electrooptical device, which includes a first substrate, a second substrate, and an electrooptical material interposed between the first and second substrates, the first substrate including a plurality of two-dimensionally arranged pixel electrodes, including pixel electrodes in a first group driven in a periodic polarity reversal manner with a first period and pixel electrodes in a second group driven in a periodic polarity reversal manner with a second period which is complementary to the first period, and the second substrate including a counter electrode arranged to face the plurality of pixel electrodes, includes a step of forming a pattern including a wiring that drives the pixel electrodes, and elements on the first substrate, a step of planarizing the top surface of the laminate on the first substrate including the pattern, a step of forming a protrusion in an area in a spacing between pixel electrodes adjacent in a plan view, by subjecting the planarized surface to photolithographic and etching processes, and a step of fabricating the plurality of pixel electrodes.

The electrooptical device manufactured in accordance with the manufacturing method of the present invention includes, on the first substrate, the plurality of two-dimensionally arranged pixel electrodes, including the first group pixel electrodes driven in the periodic polarity reversal manner with the first period and the second group pixel electrodes driven in the periodic polarity reversal manner with the second period which is complementary to the first period, and the second substrate includes a counter electrode arranged to face the plurality of pixel electrodes. Therefore, the first substrate includes (i) adjacent pixel electrodes that are respectively driven by mutually opposite polarity voltages during the periodic polarity reversal driving, and (ii) adjacent pixel electrodes that are respectively driven by the same polarity voltages during the periodic polarity reversal driving. The two types of pixel electrodes are present in the electrooptic device, such as a matrix-type liquid-crystal display device, as long as it is driven in the above-referenced 1H alternating drive method or 1S alternating drive method. The transverse electric field takes place between the adjacent pixel electrodes belonging to the different pixel electrode groups (i.e., the adjacent pixel electrodes supplied with the opposite polarity voltages).

In accordance with the present invention, the planarizing step planarizes the top surface of the laminate on the first substrate (i.e., the top surface of an insulator to be planarized formed on top of an irregular surface having a wiring on an interlayer insulator) including the pattern of the wiring for driving the pixel electrodes (such as data lines, scanning lines, and capacitive lines) and elements (such as pixel switching TFTs). The step of forming the protrusion in the area in the spacing between the pixel electrodes adjacent in a plan view is accomplished by subjecting the planarized surface to photolithographic and etching processes in succession. The pixel electrodes are then formed.

Regardless of the wiring and the elements formed below, the surface underlying the pixel electrodes includes the positively planarized area having no protrusion, and the area having the protrusion which is positively elevated to a predetermined height in a predetermined configuration. As a result, the central portion of each pixel electrode centered in the aperture of each pixel is formed on the positively planarized surface. The electrooptical device is thus free from malfunction of the electrooptical material, such as the orientation defect of the liquid crystal arising from variations in the thickness of the electrooptical material encapsulated between the pixel electrode and the counter electrode.

First, since the protrusion is positively formed in the area between the adjacent pixel electrodes through an etching process, the longitudinal electric field taking place between the pixel electrode and the counter electrode is relatively intensified with respect to the transverse electric field taking place between the adjacent pixel electrodes (in particular, the pixel electrodes belonging to the different pixel electrode groups) if the edge of each pixel electrode is formed to be positioned on the top of the protrusion. Generally, the shorter the distance between the electrodes, the stronger the electric field therebetween. Since the edge of the pixel electrode is positioned closer to the counter electrode by the height of the protrusion, the longitudinal electric field taking place therebetween accordingly intensifies. Second, regardless of whether the edge of the pixel electrode is positioned on the top of the protrusion, the transverse electric field taking place between the adjacent pixel electrodes (in particular, the pixel electrodes belonging to the different pixel electrode groups) is weakened by the dielectric constant of the protrusion, and further, the influence of the transverse electric field on the electrooptical material is reduced by reducing the volume of the electrooptical material through which the transverse electric field passes (with the electrooptical material partly replaced in volume with the protrusion). The electrooptical device is thus free from malfunction of the electrooptical material, such as the orientation defect of the liquid crystal arising from the transverse electric field caused in any of the alternating drive methods. In this case, the edge of the pixel electrode may reach the top of the protrusion as discussed above, or may not reach the top of the protrusion. Alternatively, the edge of the pixel electrode may extend to a midway point on the slant wall of the protrusion or on the substantially vertically upright wall of the protrusion.

The protrusion is much more precisely controlled with regard to the height thereof and the configuration thereof, than in the technique in which the height of the pixel electrode at the edge thereof is adjusted using the presence of the wiring and the elements present beneath the underlying surface of the pixel electrodes (a combination of unavoidable slight misalignments between patterns of numerous layers makes it fundamentally difficult to form a protrusion and a recess on the final top layer at designed height and configuration). The electrooptical device thus provides high reliability, free from the malfunction of the electrooptical material, such as the orientation defect of the liquid crystal arising from the transverse electric field.

Compared with the case in which variations exist in the thickness of the electrooptical material attributed to the presence of the wirings and the elements beneath the underlying surface of the pixel electrodes, the use of the positively planarized surface results in substantially small thickness variations. The electrooptical device is thus free from the malfunction of the electrooptical material such as the orientation defect of the liquid crystal arising from the variations in the thickness of the electrooptical material.

Further, since a light shield layer that covers the malfunctioning point of the electrooptical material is reduced in size, visible defects, such as unlit defects, are prevented, and the aperture ratio of each pixel electrode is increased.

As a result, malfunction due to the transverse electric field in the electrooptical material, such as a liquid crystal is substantially reduced, and an electrooptical device, such as a liquid-crystal device, presenting a high-contrast, bright and high-quality image, is relatively easily manufactured.

The protrusion may be formed in only the area between the adjacent pixel electrodes belonging to the different pixel electrode groups (i.e., the adjacent pixel electrodes supplied with the opposite polarity voltages) where the transverse electric field takes place. It is not necessary to form the protrusion in the area between the adjacent pixel electrodes belonging to the same pixel electrode group where no substantial transverse electric field takes place. Even if the protrusion is arranged at that location, the above-described advantage of the present invention may be provided by arranging a relatively low-profile protrusion.

The above-referenced technique is particularly effective when an element is manufactured of an active layer of a monocrystal semiconductor to enhance the performance of the driver element. The monocrystal semiconductor layer is formed of a monocrystal layer on a support substrate typically using a layer stacking method. Since the support substrate and the monocrystal layer surface are planarized and mirror-surfaced before attaching them in the layer stacking method, controlling flexibly protrusions and recesses subsequent to the formation of the elements and the wirings is difficult. As discussed above, however, configuration control is facilitated by planarizing the underlying surface beneath the pixel electrodes and by forming the protrusion. This prevents the liquid-crystal orientation defects.

In one embodiment of the manufacturing method of the electrooptical device of the present invention, the planarizing step may include depositing an insulator having a predetermined thickness, and forming a planarized insulator by subjecting the insulator having the predetermined thickness to a CMP (Chemical Mechanical Polishing) process.

In this embodiment, in the planarizing step, the insulator having the predetermined thickness is formed, and is then subjected to the CMP process. The planarized insulator thus results. The height and shape of the protrusion are easily controlled with a high accuracy.

In another embodiment of the manufacturing method of the electrooptical device of the present invention, the planarizing step may include forming a planarized insulator by applying a flowable insulator material.

In accordance with this embodiment, the planarized insulator is formed by applying the flowable insulator material through a spin coating technique or the like. In this planarizing step, the height and shape of the protrusion are relatively easily controlled with a high accuracy.

In yet another embodiment of the manufacturing method of the electrooptical device of the present invention, an element that drives the pixel electrode formed on the first substrate may be fabricated of a monocrystal semiconductor layer based on a layer stacking SOI (Silicon On Insulator) technique. The protrusion of the pixel electrode is thus flexibly formed with a good controllability through the planarization step subsequent to the formation of the element.

In still yet another embodiment of the manufacturing method of the electrooptical device of the present invention, the planarizing step may include forming beforehand a groove into which the pattern is embedded.

In accordance with this embodiment, in the planarizing step, the groove is formed in the interlayer insulator in or on the first substrate prior to the formation of the pattern including the wiring and the elements. At least the pattern is then partly embedded into the groove. The surface beneath the protrusion is relatively easily planarized. As a result, the height and shape of the protrusion are relatively easily controlled with a high accuracy.

In still yet another embodiment of the manufacturing method of the electrooptical device of the present invention, the step of forming the protrusion may form the protrusion in a grid configuration running in the spacing between the adjacent pixel electrodes.

In this embodiment, the step of forming the protrusion forms the protrusion in the grid configuration running in the spacing between the adjacent pixel electrodes. The protrusion grid thus reduces the adverse effect of the transverse electric field during the periodic polarity reversal driving regardless of whether the adjacent pixel electrodes belonging to the different pixel electrode groups are arranged in a direction of rows or a direction of columns within an image display area.

In this embodiment, the step of forming the protrusion may form the protrusion in the grid configuration so that the protrusion having a first height is formed between adjacent pixel electrodes which are included in the different pixel electrode groups, and so that the protrusion having a second height, lower than the first height, is formed between adjacent pixels which are included in the same pixel electrode group.

In this embodiment, in the step of forming the protrusion, the protrusion having the first height (which is greater than the second height) is formed in the area between the pixel electrodes where a stronger transverse electric field takes place, thereby relatively intensifying the longitudinal electric field (namely, by shortening the gap between the edge of the pixel electrode and the counter electrode). On the other hand, the protrusion having the second height is formed in the area between the adjacent pixel electrodes where substantially no transverse electric field takes place, and it suffices to slightly intensify the longitudinal electric field.

In this embodiment, the method for manufacturing an electrooptical device may further include a step of forming an alignment layer on the plurality of pixel electrodes, and a step of subjecting the alignment layer to a rubbing process in a direction parallel to a step of the protrusion having the first height.

When the alignment layer deposited on the protrusion is subjected to the rubbing process in a direction parallel to the step of the protrusion having a relatively higher height, malfunction of the electrooptical material due to variations in a plan view in the thickness of the electrooptical material is controlled. Generally, if the rubbing process is performed in perpendicular to the step, the orientation of the electrooptical material is disturbed by the alignment layer that has undergone the rubbing process. The degree of disturbance increases with the magnitude of the step. By controlling the malfunction of the electrooptical material due to the variations in a plan view in the thickness of the electrooptical material in response to a large step (malfunction of the electrooptical material due to the variations in the thickness of the electrooptical material in response to a small step is essentially small regardless of the direction of the rubbing process), malfunction of the electrooptical material arising from the step of the protrusion is reduced.

In another embodiment of the manufacturing method of the electrooptical device of the present invention, the step of forming the protrusion may form striped protrusions in a plan view by forming the protrusion between the adjacent pixel electrodes which are included in the different pixel electrode groups, and form no protrusions between the adjacent pixel electrodes which are included in the same pixel electrode group.

In this embodiment, in the step of forming the protrusion, the protrusion is formed between the adjacent pixel electrodes included in the different pixel electrode groups (with the transverse electric field taking place), and no protrusion is formed between the adjacent pixel electrodes included in the same pixel electrodes (with almost no transverse electric field taking place). The striped protrusion thus formed in the area where the transverse electric field occurs reduces the adverse effect of the transverse electric field during the periodic polarity reversal driving.

In this embodiment, the method for manufacturing an electrooptical device may further include a step of forming an alignment layer on the plurality of pixel electrodes, and a step of subjecting the alignment layer to a rubbing process in a direction parallel to a step of the protrusion.

Malfunction of the electrooptical material arising from the step is controlled if the rubbing process is performed on the alignment layer formed on top of the protrusion in a parallel direction with the step of the protrusion. If the rubbing process is performed in a direction perpendicular to the step, the orientation of the electrooptical material is disturbed by the alignment layer that has been rubbed. By performing the rubbing process in a direction parallel with the step, malfunction of the electrooptical material attributed to the step is thus controlled.

In another embodiment of a method for manufacturing an electrooptical device, the step of forming the protrusion may form the protrusion using a wet etching process.

In accordance with this embodiment, the inclination of the step of the protrusion becomes moderate, and malfunction of the electrooptical material due to the step is controlled. Generally speaking, the steeper the angle of the step, the more the orientation of the electrooptical material is disturbed. With a moderate angle step formed through the wet etching process, the malfunction of the electrooptical material due to the step is reduced given the same height protrusion.

In yet another embodiment of a method for manufacturing an electrooptical device, the step of forming the protrusion may form the protrusion through a dry etching process and a wet etching process subsequent to the dry etching process.

In this embodiment, the protrusion is formed through the dry etching process with a high dimensional accuracy, and then the steep step protrusion formed through the dry etching process is moderated in the inclination thereof with the wet etching process subsequent to the dry etching process. A fine protrusion having a high position accuracy and a high dimensional accuracy is formed while the malfunction of the electrooptical material due to the step is controlled.

In still another embodiment of a method for manufacturing an electrooptical device, the step of forming the protrusion may include performing a photolithographic process which uses a mask that is used to produce the wiring during the step of forming the pattern.

In accordance with this embodiment, the same mask is shared by the photolithographic process for the formation of the wiring and by the photolithographic process for the formation of the protrusion. Manufacturing costs are thus low, compared with the case in which dedicated masks are used.

In this embodiment, the step of forming the protrusion may form the protrusion having a width different from the width of the wiring by using the mask and by adjusting an exposure level.

The same mask is shared by the photolithographic process for the formation of the wiring and by the photolithographic process for the formation of the protrusion, while the width of the wiring and the width of the protrusion are made different by adjusting the exposure level. This arrangement reduces the manufacturing cost while increasing designing variations.

In another embodiment, a method for manufacturing an electrooptical device may further include a step of forming the other protrusion on the second substrate facing the spacing between the adjacent pixel electrodes.

The protrusion arranged on the second substrate in this embodiment decreases the distance between the pixel electrode and the counter electrode in the area where the transverse electric field is generated, thereby relatively intensifying the longitudinal electric field. In addition, the presence of the protrusion weakens the transverse electric field, thereby reducing the effect of the transverse electric field on the electrooptical material. The adverse effect of the transverse electric field is reduced.

In this embodiment, the method for manufacturing an electrooptical device may further include a step of forming the other alignment layer on the second substrate, and a step of subjecting another alignment layer to a rubbing process in a direction parallel to a step of the other protrusion.

The malfunction of the electrooptical material due to the step is controlled by performing the rubbing process on the other alignment layer formed on the second substrate in a direction parallel to the step of the other protrusion.

The method for manufacturing an electrooptical device may further include a step of forming a light shield layer in a region on the second substrate facing the spacing between the adjacent pixel electrodes, wherein the step of forming the other alignment layer forms the other alignment layer using the presence of the light shield layer.

In this arrangement, the other protrusion is formed on the second substrate, using the light shield layer on the second substrate (the counter substrate), generally called black matrix or black mask (BM). The manufacturing process and the construction of the electrooptical device are advantageously simple, compared with the case in which dedicated layers are used in the formation of the protrusion.

To resolve this problem, an electrooptical device of the present invention includes a first substrate, a second substrate, and an electrooptical material interposed between the first and second substrates, wherein the first substrate includes a plurality of two-dimensionally arranged pixel electrodes, including pixel electrodes in a first group driven in a periodic polarity reversal manner with a first period and pixel electrodes in a second group driven in a periodic polarity reversal manner with a second period which is complementary to the first period, a pattern including a wiring that drives the pixel electrode and an element, and a protrusion that is formed in a spacing between pixel electrodes adjacent in a plan view, by performing a photolithographic process and an etching process onto a planarized top surface of the laminate of the first substrate after the planarization of the top surface of the laminate of the first substrate in a manufacturing process, and wherein the second substrate includes a counter electrode facing the plurality of pixel electrodes.

In the electrooptical device of this invention, the transverse electric field takes place between the adjacent pixel electrodes belonging to the different pixel electrode groups (i.e., the adjacent pixel electrodes supplied with opposite polarity voltages). Through the etching process, the protrusion is positively formed in the edge of each pixel electrode adjacent to or in the non-aperture area of each pixel. First, the longitudinal electric field taking place between the pixel electrode and the counter electrode is relatively intensified with respect to the transverse electric field taking place between the adjacent pixel electrodes if the edge of each pixel electrode is positioned on the top of the protrusion. Second, regardless of whether the edge of the pixel electrode is positioned on the top of the protrusion, the transverse electric field taking place between the adjacent pixel electrodes is weakened by the dielectric constant of the protrusion, and further, the influence of the transverse electric field on the electrooptical material is reduced by reducing the volume of the electrooptical material through which the transverse electric field passes. The electrooptical device is thus free from malfunction of the electrooptical material such as the orientation defect of the liquid crystal arising from the transverse electric field caused in any of the alternating drive methods. In this case, the edge of the pixel electrode may reach the top of the protrusion as discussed above, or may not reach the top of the protrusion. Alternatively, the edge of the pixel electrode may extend to a midway point on the slant wall of the protrusion or on the substantially vertically upright wall of the protrusion.

The central portion of the pixel electrode in the aperture area of each pixel is formed on the positively planarized surface. This arrangement reduces malfunction of the electrooptical material such as the orientation defect of the liquid crystal arising from variations in the thickness of the electrooptical material encapsulated between the pixel electrode and the counter electrode. Further, since a light shield layer that covers the malfunctioning point of the electrooptical material is reduced in size, visible defects such as unlit defects are prevented, and the aperture ratio of each pixel electrode is increased.

As a result, malfunction due to the transverse electric field in the electrooptical material such as a liquid crystal is substantially reduced, and an electrooptical device such as a liquid-crystal device presents a high-contrast, bright, and high-quality image.

The present invention is applicable to not only a transmissive-type electrooptical device and a reflective-type electroopitcal device, but also other variety of electrooptical devices.

These operations and other advantages will become obvious from the following discussion of the embodiments of the present invention.

DETAILED DESCRIPTION OF PREFERRED EMBODIMENTS

Figure 1:
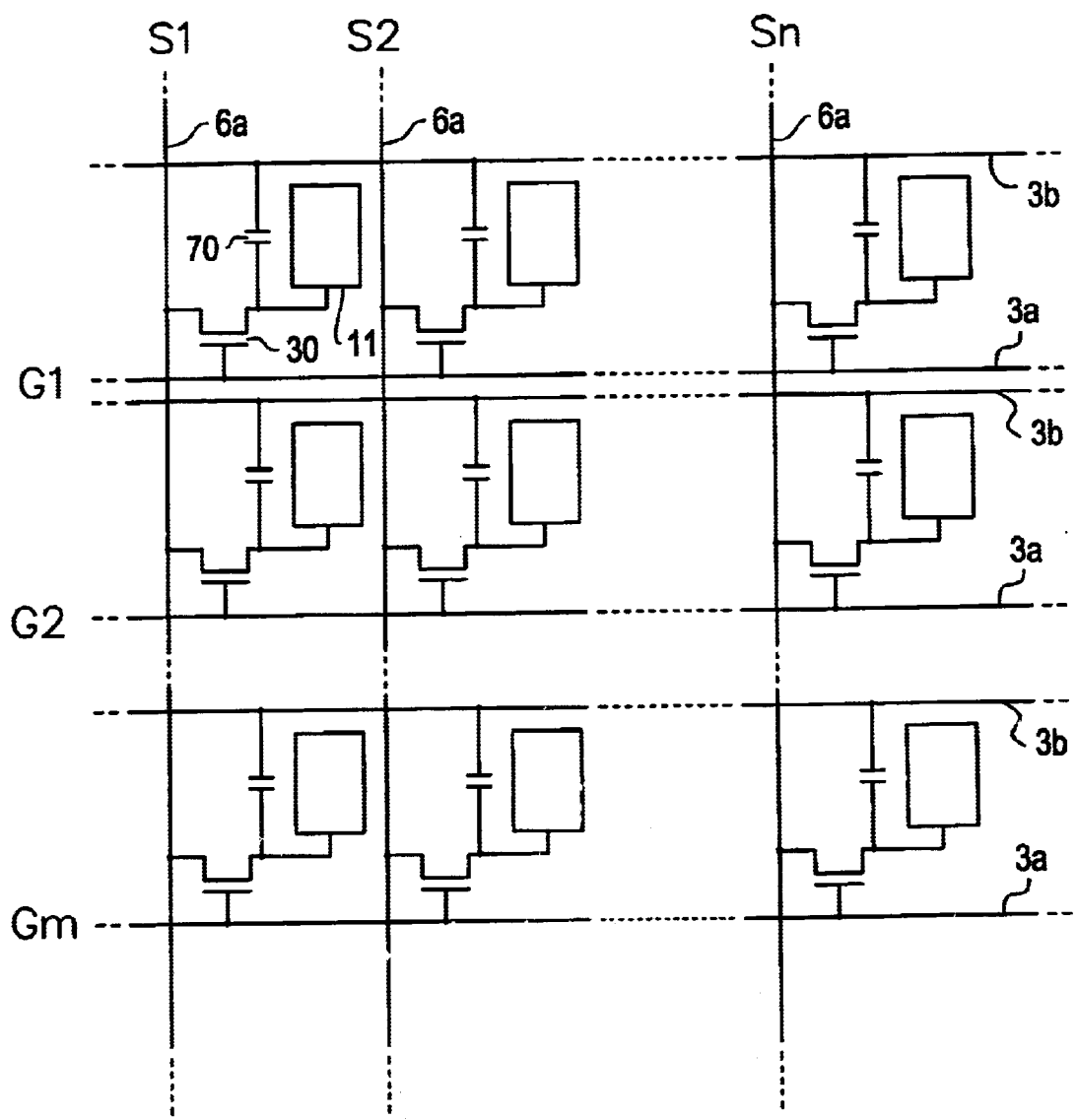
FIG. 1 is an equivalent circuit diagram of a variety of elements and lines in a plurality of pixels arranged in a matrix, constituting an image display area of the electrooptic device of a first embodiment.

The embodiments of the present invention are discussed, referring to the drawings. In the following embodiments, the electrooptical device of the present invention is embodied in a liquid-crystal device.

Figure 2:
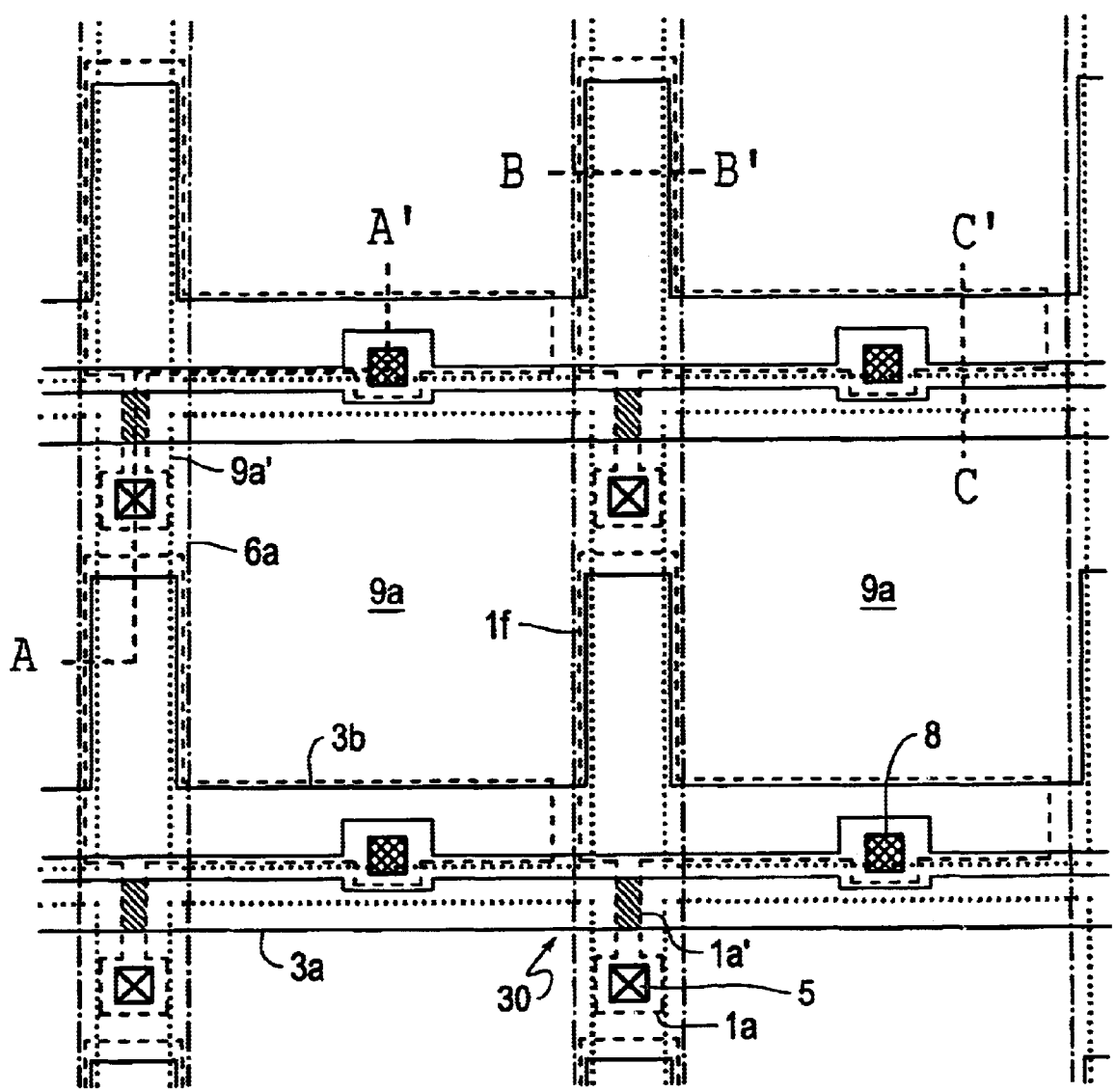
FIG. 2 is a plan view showing pixel groups formed of a plurality of adjacent pixels in a TFT array substrate having a data line, a scanning line, a pixel electrode, etc. in the electrooptic device of the first embodiment.
Figure 3:
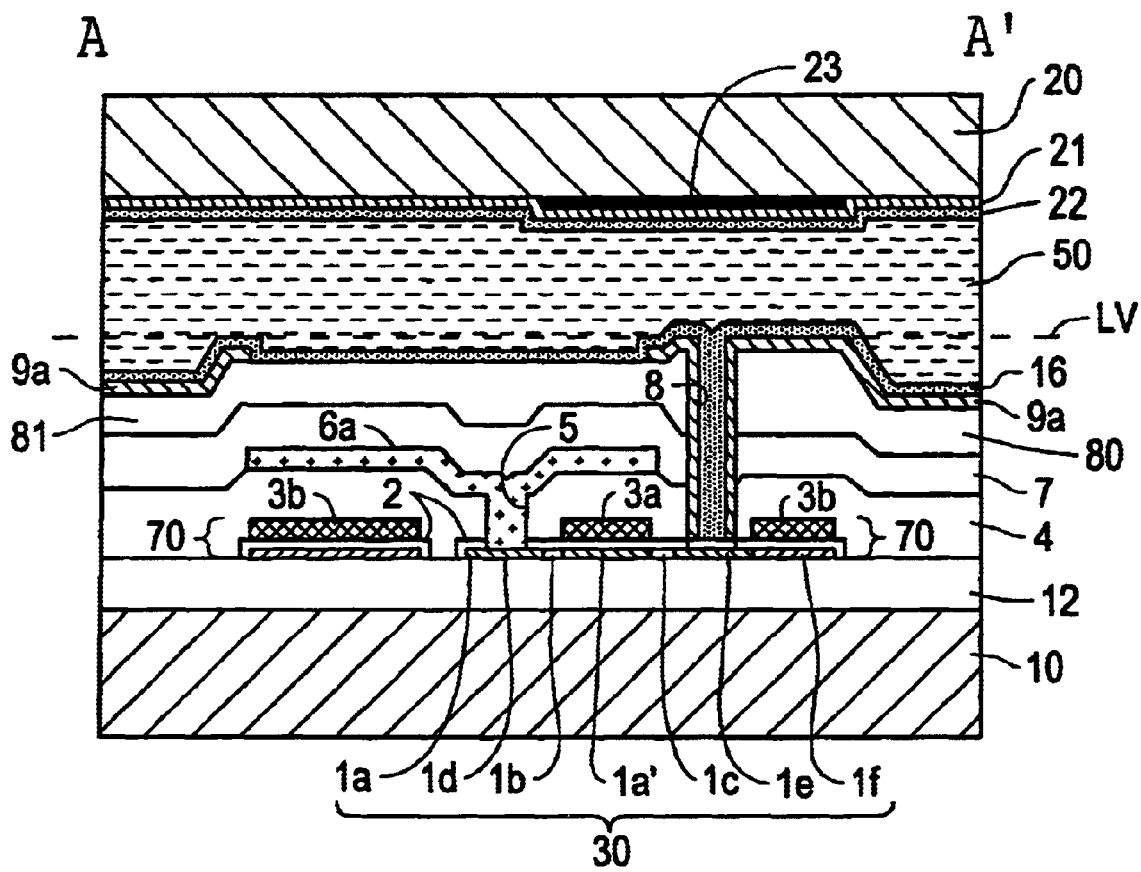
FIG. 3 is a cross-sectional view taken along plane A–A' in FIG. 2.
Figure 4:
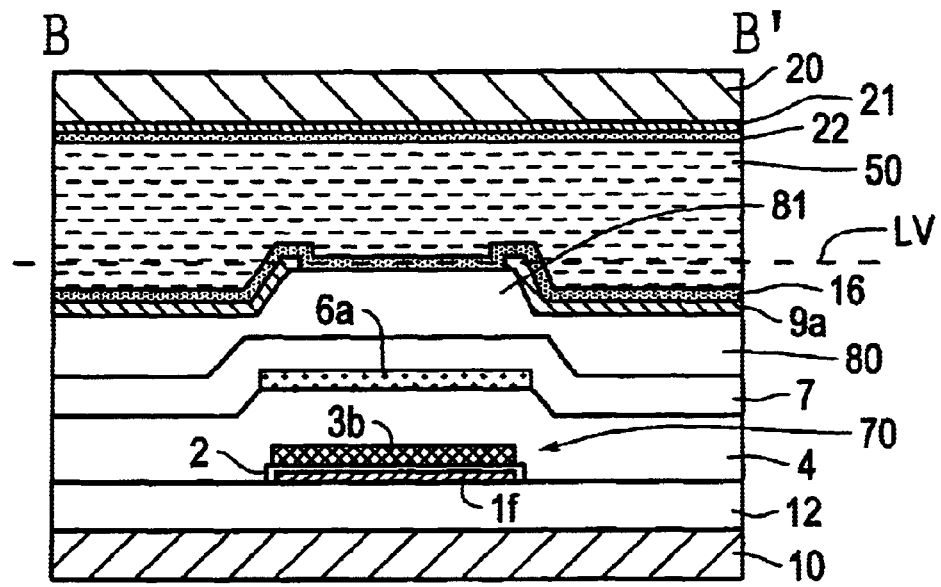
FIG. 4 is a cross-sectional view taken along plane B–B' in FIG. 2.
Figure 5:
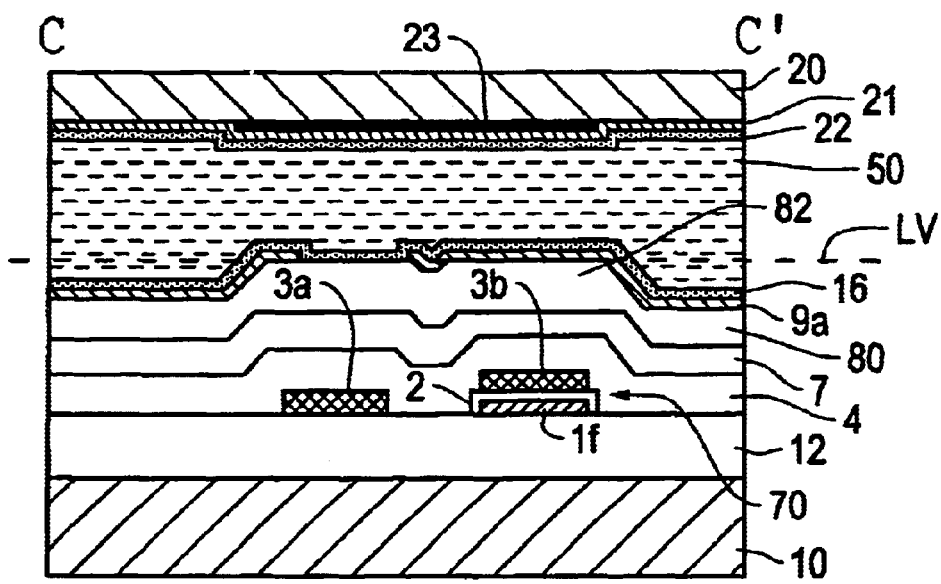
FIG. 5 is a cross-sectional view taken along plane C–C' in FIG. 2.

An electrooptic device of one embodiment of the present invention is now discussed, referring to FIG. 1 through FIG. 5. FIG. 1 is an equivalent circuit diagram of a variety of elements and lines in a plurality of pixels arranged in a matrix, constituting an image display area of the electrooptic device. FIG. 2 is a plan view showing a plurality of pixel groups formed of a plurality of adjacent pixels in a TFT array substrate bearing data lines, scanning lines, pixel electrodes, etc., FIG. 3 is a cross-sectional view taken along plane A–A' in FIG. 2, FIG. 4 is a cross-sectional view taken along plane B–B' in FIG. 2, and FIG. 5 is a cross-sectional view taken along plane C–C' in FIG. 2. In FIG. 3 through FIG. 5, layers and members are drawn in different scales to present them more distinctly in figures.

Referring to FIGS. 1 and 2, the plurality of the pixels arranged in a matrix constituting the image display area of the electrooptic device of the present invention include pixel electrodes 9a and TFTs 30 that control the respective pixel electrodes 9a, arranged in a matrix, and data lines 6a carrying a video signal are respectively electrically connected to the sources of the TFTs 30. Video signals S1, S2, . . . , Sn may be supplied on the data lines 6a in a one-line-at-a-time manner in that order, or may be supplied to a group of adjacent data lines 6a at a time on a group-by-group basis. Scanning lines 3a are respectively electrically connected to the gates of the TFTs 30 and are supplied with scanning signal G1, G2, . . . , Gm in the form of pulse at a predetermined timing in a one-line-at-a-time manner in that order. Pixel electrodes 9a are respectively electrically connected to the drains of the TFTs 30, and the video signals S1, S2, . . . , Sn fed through the data lines 6a are written at a predetermined timing by closing the TFTs 30, as a switching element, for a predetermined duration of time. The video signals S1, S2, . . . , Sn at a predetermined level, which are written on a liquid crystal as an example of an electrooptic material through the pixel electrodes 9a, are stored in the liquid crystal for a predetermined duration of time with an counter electrode (to be discussed later) formed on an counter substrate (to be discussed later). The liquid crystal modulates light to present it in a grayscale by varying the orientation or the order of the collection of molecules based on an applied voltage level. In a normally white mode, transmittance ratio to incident light is reduced in response to a voltage supplied to each pixel, while in a normally black mode, transmittance ratio to incident light is increased in response to a voltage supplied to each pixel, and as a result, the electrooptic device outputs light bearing a contrast responsive to the video signal. To prevent the stored video signal from leaking, a storage capacitor 70 is added in parallel with the capacitor of the liquid crystal formed between the pixel electrode 9a and the counter electrode.

Referring to FIG. 2, a matrix of transparent pixel electrodes 9a (the peripheral outline of which is represented by broken lines 9a') is arranged on a TFT array substrate of the electrooptic device, and the data line 6a, and the scanning line 3a extend along the vertical and horizontal borders between the pixel electrodes 9a. Further, a capacitive line 3b is arranged in stripes along the scanning line 3a. Specifically, the capacitive line 3b includes a main line portion that substantially linearly extends along the scanning line 3a and a projecting portion that upwardly projects along the data line 6a from an intersection thereof with the data line 6a as shown in FIG. 2.

The scanning line 3a is arranged to face a channel region 1a' of a semiconductor layer 1, represented by an area hatched with rightwardly downwardly inclined lines in FIG. 2, and the scanning line 3a functions as a gate electrode. In this way, a pixel switching TFT 30, with the scanning line 3a facing the channel region 1a ' as the gate electrode thereof, is arranged at each intersection of the scanning line 3a and the data line 6a.

Referring to FIG. 2 and FIG. 3, the data line 6a is electrically connected to a heavily doped source region 1d of the semiconductor layer 1a through a contact hole 5. On the other hand, a pixel electrode 9a is electrically connected to a heavily doped drain region 1e of the semiconductor layer 1a through a contact hole 8.

A pixel potential capacitor electrode if extending from the heavily doped drain region 1e and a portion of fixed potential capacitor electrode of the capacitive line 3b are opposed to each other with a thin insulator 2 as a dielectric interposed therebetween, thereby forming a storage capacitor 70. The capacitive line 3b extends about the image display area where the pixel electrode 9a is arranged, and is fixed to a constant voltage power source for a constant voltage.

Referring to FIG. 3 through FIG. 5, the electrooptical device includes a transparent TFT array substrate 10 and a transparent counter substrate 20 opposed to the transparent TFT array substrate 10. The TFT array substrate 10 is fabricated of a quartz substrate, a glass substrate, or a silicon substrate, for instance, and the counter substrate 20 is fabricated of a glass substrate or a quartz substrate, for instance.

The TFT array substrate 10 is provided with the pixel electrodes 9a, and arranged on top of them is an alignment layer 16 which has been subjected to a predetermined alignment process such as a rubbing process. The pixel electrode 9a is fabricated of a transparent, electrically conductive film, such as an ITO (Indium Tin Oxide) film. The alignment layer 16 is fabricated of an organic thin film, such as a polyimide thin film.

The counter substrate 20 has a counter electrode 21 extending on the entire surface thereof, and an alignment layer 22 therebeneath that has been subjected to a predetermined alignment process such as a rubbing process. The counter electrode 21 is fabricated of a transparent, electrically conductive film, such as an ITO film. The alignment layer 22 is fabricated of an organic thin film such as a polyimide thin film. Arranged on the counter substrate 20 is a light shield layer 23, typically referred to as a black mask or a black matrix (MB), in a non-aperture area in each pixel as shown in FIG. 3 and FIG. 5. For this reason, no incident light enters the channel region 1a', a lightly doped source region 1b, and a lightly doped drain region 1c of the semiconductor layer 1a of the pixel switching TFT 30, from the counter substrate 20. The light shield layer 23 has the function of enhancing contrast ratio, and the function of preventing color mixing of color materials when a color filter is produced. In this embodiment, the data line 6a having light shield property and constructed of Al or the like may be used to light shield the non-aperture area of each pixel to define a segment of the outline of the aperture area of each pixel along the data line 6a (in this case, a striped light shield layer 23 running along the scanning line 3a may be arranged), or a light shield layer 23 arranged on the counter substrate 20 may redundantly or solely light shield the non-aperture area along the data line 6a (a grid-like light shield layer 23 may be arranged in this case). Instead of the light shield layer or in addition to the light shield layer, an embedded light shield layer fabricated of a refractory metal may be included in the lamination on the TFT array substrate 10 to define partly or entirely the aperture of each pixel.

Referring to FIG. 3 through FIG. 5, a liquid crystal, as one example of the electrooptic material, is encapsulated, in a gap surrounded by a sealing material to be discussed later, between the TFT array substrate 10 and the counter substrate 20 arranged with the pixel electrode 9a facing the counter electrode 21 as discussed above, and a liquid-crystal layer 50 is thus formed. The liquid-crystal layer 50 takes a predetermined orientation state by the alignment layer 16 and the alignment layer 22 with no electric field applied by the pixel electrode 9a. The liquid-crystal layer 50 is, for instance, formed of a mixture of one or several types of nematic liquid crystals. The sealing material is an adhesive agent made of a thermal setting agent or a photo-setting agent for bonding the TFT array substrate 10 to the counter substrate 20 along the edges thereof, and is mixed with a gapping material such as glass fiber or glass beads to keep a predetermined distance between the two substrates.

An underlying insulating layer 12 is arranged beneath the plurality of the pixel switching TFTs 30. The underlying insulating layer 12 extends on the entire surface of the TFT array substrate 10, preventing irregularities during the polishing of the surface of the TFT array substrate 10 and dirt left after a cleaning operation, from degrading the characteristics of the pixel switching TFT 30.

The pixel switching TFT 30 has an LDD (Lightly Doped Drain) structure, and includes the scanning line 3a, the channel region 1a' of the semiconductor layer 1a in which a channel is formed by the electric field from the scanning line 3a, the thin insulator layer 2 including the gate insulator for insulating the scanning line 3a from the semiconductor layer 1a, the lightly doped source region 1b and the lightly doped drain region 1c of the semiconductor layer 1a, and the heavily doped source region 1d and the heavily doped drain region 1e of the semiconductor layer 1a.

Formed on top of the scanning line 3a is a first interlayer insulator 4 having the contact hole 5 connecting to the heavily doped source region 1d and the contact hole 8 connecting to the heavily doped drain region 1e.

The data line 6a is formed on the first interlayer insulator 4, and a second interlayer insulator 7 having the contact hole 8 drilled therethrough is formed on the data line 6a.

In this embodiment, a third interlayer insulator 80 is formed on the second interlayer insulator 7. The third interlayer insulator 80 includes a ridge-like protrusion 81 (as best seen from FIG. 4) extending along the data line 6a, if viewed from above, and raised from the TFT array substrate 10, and a ridge-like protrusion 82 (as best seen from FIG. 5) extending along the scanning line 3a, if viewed from above, and vertically raised from the TFT array substrate 10. The protrusion 81 and the protrusion 82, in a grid-like configuration if viewed from above, generally extend over the image display area in the non-aperture areas of the pixels. The protrusion 81 and the protrusion 82 are produced by forming, on the second interlayer insulator 7, an insulator to be planarized, as will be described later, subjecting the insulator to the CMP process for planarization, and then etching the insulator to leave the protrusion 81 and the protrusion 82. Specifically, the third interlayer insulator 80 is positively planarized in the aperture region of each pixel, and is positively protruded in the p non-aperture area of each pixel. The pixel electrode 9a is deposited on the top surface of the third interlayer insulator 80 thus constructed. In the cross-sectional views shown in FIG. 3 through FIG. 5, a broken line represents a level LV of the surface of the insulator which has been planarized through the CMP process.

In this embodiment, the 1H alternating drive method, from among the above-referenced conventional alternating drive methods, is performed. In this way, the electrooptical device avoids the degradation of the liquid crystal resulting from the application of a direct current while presenting an image with a reduced flickering and a reduced vertical cross talk in particular, taking place with the period of frame or field.

Figure 6A:
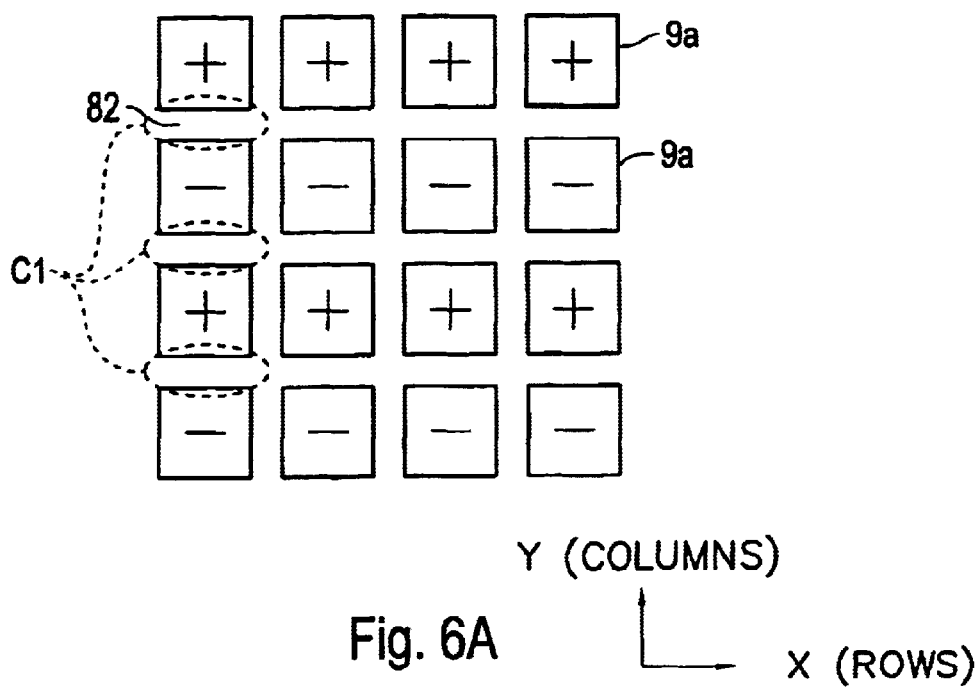
FIGS. 6(a) and 6(b) are diagrammatic plan views showing a voltage polarity in each pixel electrode and an area where a transverse electric field takes place in a 1H alternating drive method used in the embodiment.
Figure 6B:
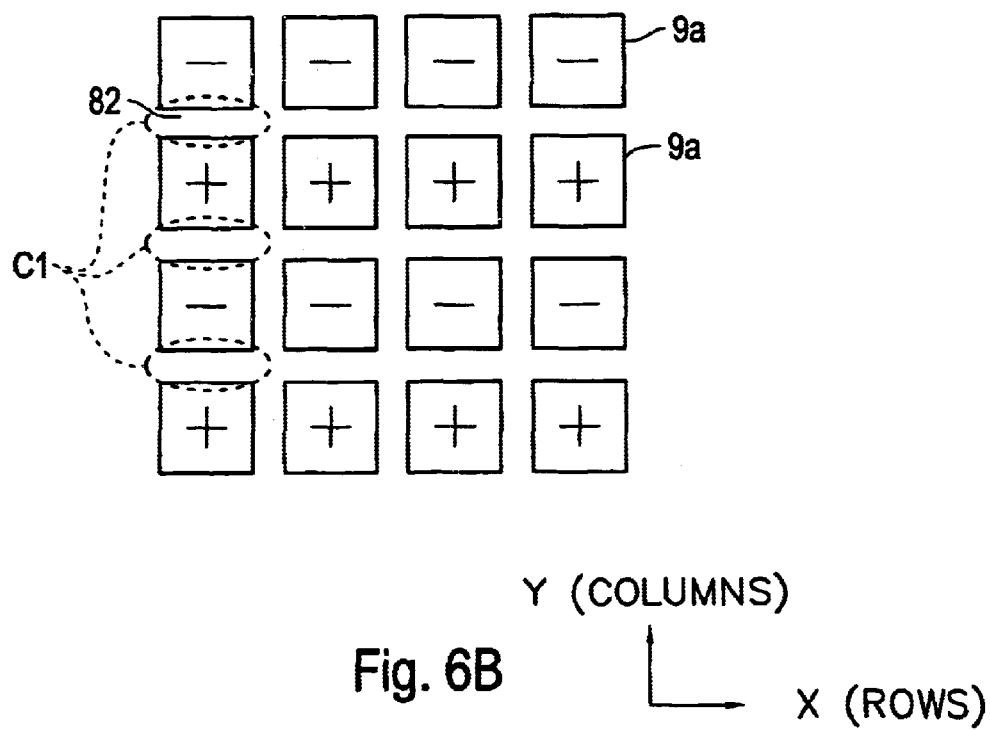

The relationship between the voltage polarity of adjacent pixel electrodes 9a and the generation area of the transverse electric field in the 1H alternating drive method adopted in this embodiment is now discussed, referring to FIGS. 6(a) and 6(b).

Referring to FIG. 6(a), during the presentation of an n-th (n is a natural number) field video signal or frame video signal, the polarity of the liquid-crystal driving voltage represented by + or − in each pixel electrode 9a is not inverted, and the pixel electrodes 9a are driven by the same polarity on a row by row basis. Referring to FIG. 6(b), during the presentation of an (n+1)-th field video signal or frame video signal, the voltage polarity of the liquid-crystal driving voltage in the pixel electrodes 9a is inverted, and during the presentation of the (n+1)-th field or frame video signal, the polarity of the liquid-crystal driving voltage represented by + or − in each pixel electrode 9a is not inverted, and the pixel electrodes 9a are driven by the same polarity on a row by row basis. The states shown in FIG. 6(a) and FIG. 6(b) are repeated with the period of field and frame, and the device is driven in the 1H alternating drive method in this embodiment. As a result, in accordance with this embodiment, the device is free from the degradation of the liquid-crystal through the application of the direct current while presenting an image with reduced cross talk and reduced flickering. The 1H alternating drive method outperforms the 1S alternating drive method in that almost no vertical cross talk is presented.

Referring to FIG. 6(a) and FIG. 6(b), in the 1H alternating drive method, the generation area C1 of the transverse electric field is always located in the spacing between pixel electrodes 9a adjacent in a direction of columns (a Y direction).

Referring to FIG. 3 and FIG. 5, the protrusion 82 formed in this embodiment intensifies the longitudinal electric field in the vicinity of the edge of the pixel electrode 9a on the top of the protrusion 82 while weakening the transverse electric field. Specifically, referring to FIG. 5, the distance between the edge portion of the pixel electrode 9a located on top of the protrusion 82 and the counter electrode 21 is shortened by the step (height) of the protrusion 82. The narrower the spacing between the adjacent pixel electrodes 9a, the stronger the transverse electric field, and therefore, the spacing between the adjacent pixel electrodes 9a is constant, and the transverse electric field also remains constant in strength as shown in FIG. 3 and FIG. 5. Referring to FIGS. 6(a) and 6(b), the longitudinal electric field intensifies relative to the transverse electric field in the generation area C1 of the transverse electric field.

The presence of the protrusion 82 fabricated of the insulator weakens the strength of the transverse electric field while reducing the volume of the liquid crystal affected by the transverse electric field by the protrusion 82 in which the transverse electric field is present. The effect of the transverse electric field on the liquid-crystal layer 50 is reduced.

As a result, the longitudinal electric field becomes predominant, thereby preventing the orientation defect of the liquid crystal in the generation area C1 of the transverse electric field.

In accordance with the present embodiment, focusing on the characteristics of the transverse electric field generated in the 1H alternating drive method, the longitudinal electric field is relatively intensified by arranging the protrusion 82 in the generation area C1 of the transverse electric field, thereby reducing the adverse effect of the transverse electric field. In this way, the orientation defect of the liquid crystal resulting from the transverse electric field is generally reduced and the light shield layer 23 for hiding the orientation defect portions of the liquid crystal is reduced in size (however, the light shield layer 23 is preferably set to be slightly wider in width than the protrusion 82 to cover the orientation defect of the liquid crystal attributed to the step of the protrusion 82). The aperture ratio of each pixel is increased without creating image defects such as an unlit defect, and a high-contrast ratio, bright, and high-quality image is thus presented.

In this embodiment, the edge of the pixel electrode 9a is preferably positioned on the side edge portion of the longitudinally extending protrusion 82. In this arrangement, the distance between the pixel electrode 9a at the edge thereof and the counter electrode 21 is shortened by taking advantage of the height of the protrusion 82. At the same time, the width of the top surface of the protrusion 82 is fully utilized to widen the spacing between the adjacent pixel electrodes 9a where the transverse electric field is generated. In this way, the configuration of the protrusion 82 is efficiently used, thereby intensifying the longitudinal electric field relative to the transverse electric field generated in the generation area C1.

The cross-sectional shape of the protrusion 82 perpendicular to the length direction of the protrusion may be any of a variety of shapes, such as a trapezoid, a triangle, a semi-circle, a semi-ellipsoid, a semi-circle or semi-ellipsoid having a flattened top surface, a quadratic curve with the gradient thereof increasing as it rises, a cubical curve outline having an approximate trapezoidal shape, or a cubical curve outline having an approximate triangular shape. In practice, the cross-sectional shape may be appropriately determined to minimize the orientation defect of the liquid crystal resulting from the step in accordance with the property of the liquid crystal.

In this embodiment, the protrusion 82 is arranged in the generation area C1 of the transverse electric field along the scanning line 3a as shown in FIGS. 6(a) and 6(b), while the protrusion 81 is arranged in the non-aperture area of each pixel along the data line 6a as shown in FIG. 3 and FIG. 4. This is because a weak transverse electric field is generated in the non-aperture area of each pixel along the data line 6a in response to the video signal. However, since a weak transverse electric field takes place between the horizontally adjacent pixel electrodes (see FIGS. 6(a) and 6(b)) with the liquid-crystal drive voltage at the same polarity voltage applied, it is acceptable for the protrusion 81 to be lower in height than the protrusion 82. For example, when the liquid-crystal layer 50 is as thick as 3 μm, the height of the protrusion 82 is 0.5 μm, and the height of the protrusion 81 is 0.35 μm. To prevent the orientation defect of the liquid crystal in the generation area C1 of the transverse electric field, the protrusion 81 may be entirely eliminated (i.e., the striped protrusion 82 is only arranged along the scanning line 3a).

Figure 7A:
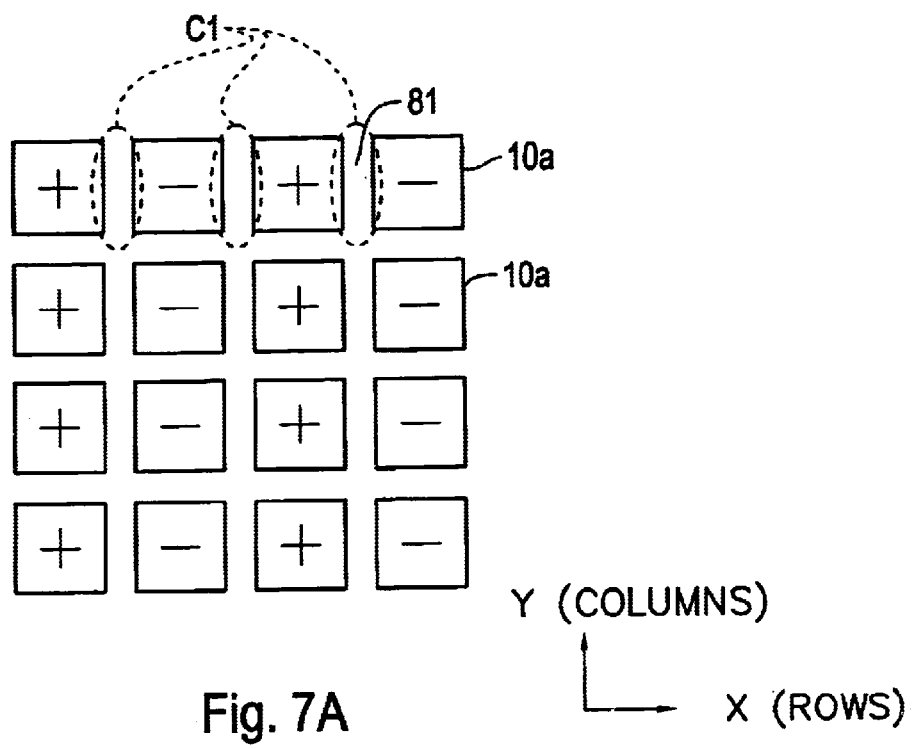
FIGS. 7(a) and 7(b) are diagrammatic plan views showing a voltage polarity in each pixel electrode and an area where a transverse electric field takes place in a 1S alternating drive method applicable to the embodiment.
Figure 7B:
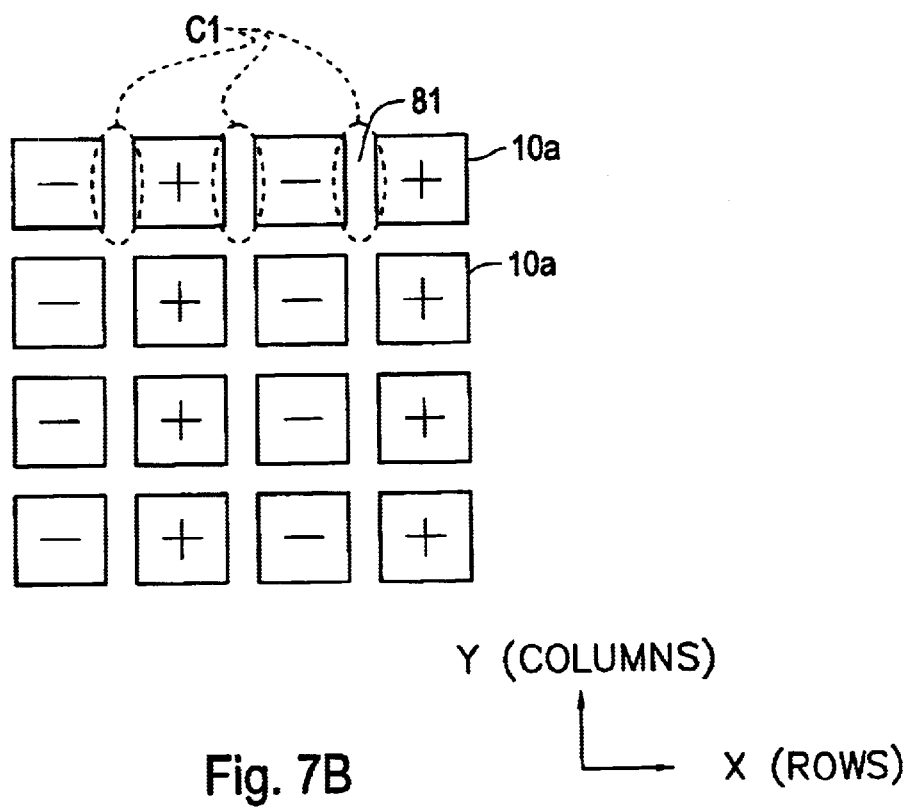
Figure 8A:
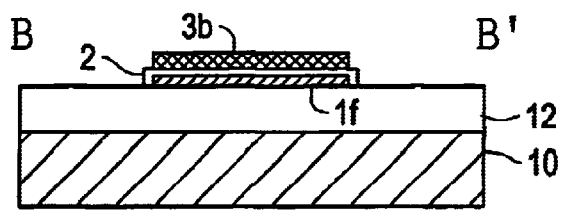
FIGS. 8(a)–8(e) are diagrammatic cross-sectional views successively showing the manufacturing process of the electrooptical device of the embodiment, taken along plane B–B' in FIG. 2.
Figure 8B:
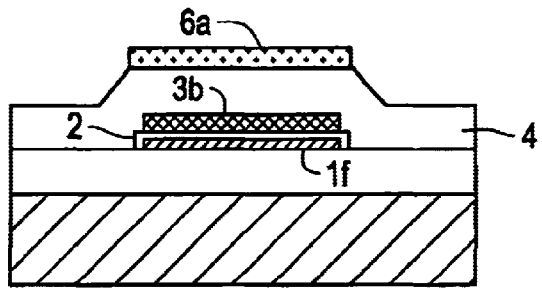
Figure 8C:
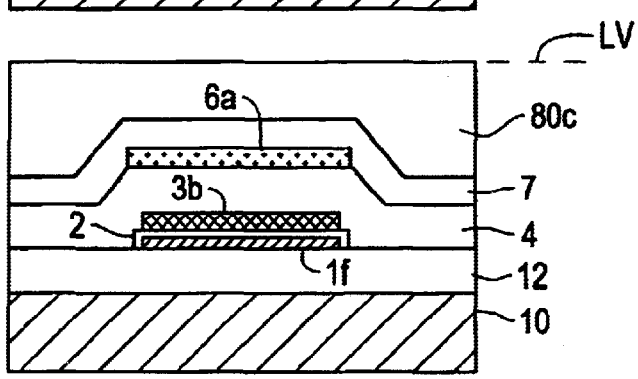
Figure 8D:
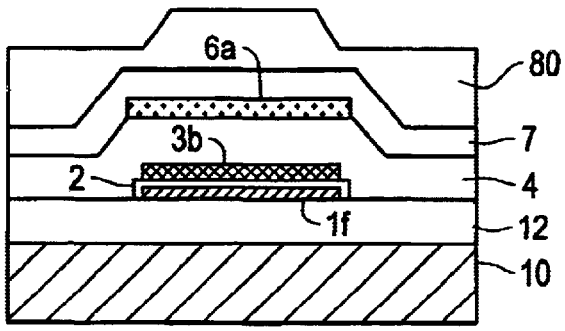
Figure 8E:
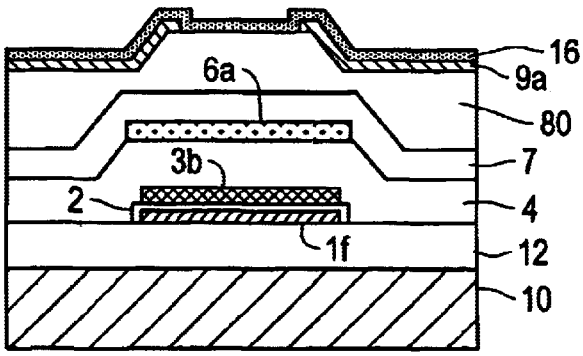
Figure 9A:
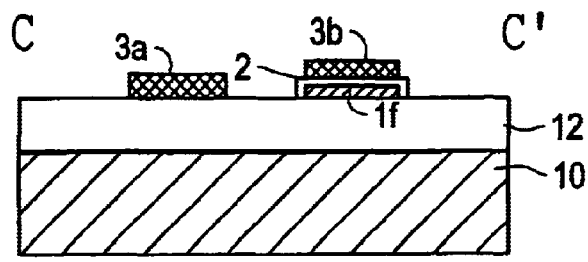
FIGS. 9(a)–9(e) are diagrammatic cross-sectional views successively showing the manufacturing process of the electrooptical device of the embodiment, taken along plane C–C' in FIG. 2.
Figure 9B:
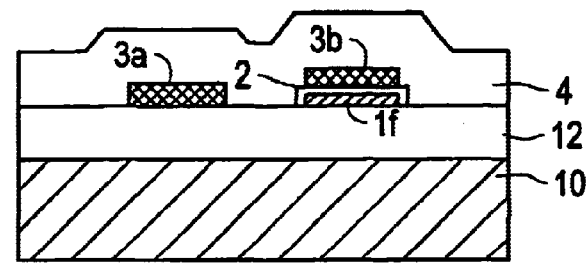
Figure 9C:
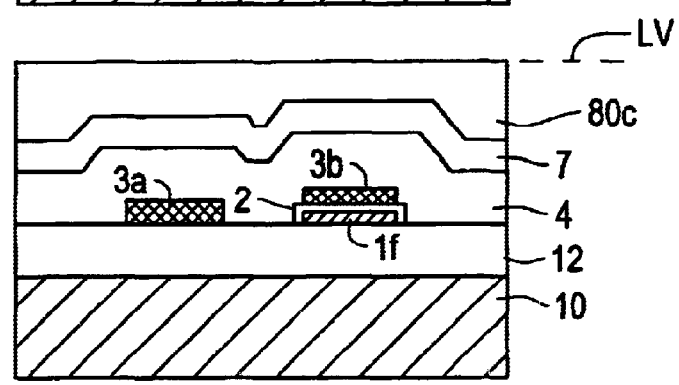
Figure 9D:
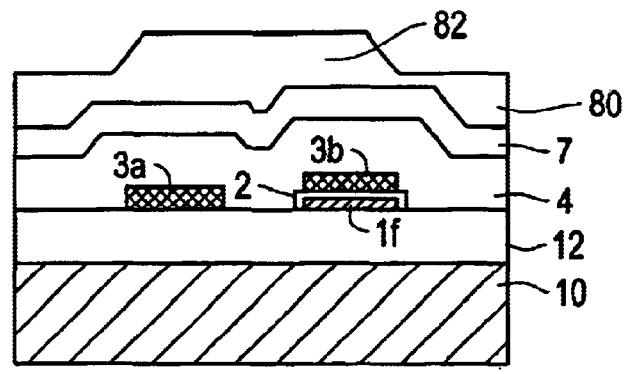
Figure 9E:
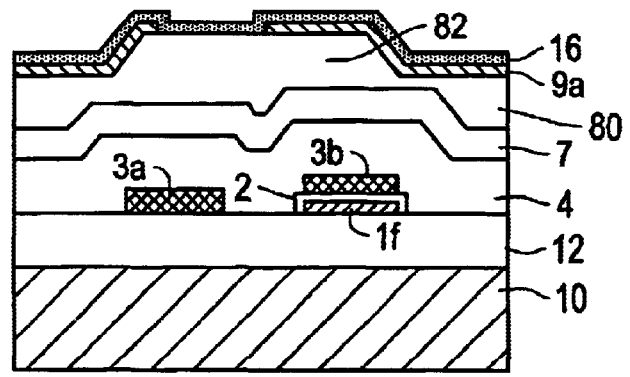

In this embodiment, the protrusion 81 may be set to be higher than the protrusion 82 (for example, when the liquid-crystal layer 50 is as thick as 3 μm, the height of the protrusion 81 is 0.5 μm, and the height of the protrusion 82 is 0.35 μm), in the arrangement shown in FIG. 3 through FIG. 5, when the relationship between the voltage polarity of the adjacent pixel electrodes 9a and a generation area C2 of the transverse electric field is in the 1S alternating drive method shown in FIGS. 7(a) and 7(b) (in other words, the polarity of the liquid-crystal drive voltage changes every column, causing the generation area C2 of the transverse electric field to be in the spacing between the pixels along the data line 6a). To prevent orientation defect of the liquid crystal in the generation area C2 of the transverse electric field, the protrusion 82 may be entirely eliminated (i.e., the striped protrusion 81 only is arranged along the data line 6a).

When the dot alternating drive method (i.e., the method in which the generation area of the transverse electric field lies in the spacing between the pixels along the data line 6a and the scanning line 3a when the polarity of the liquid-crystal drive voltage is inverted every row and every column) is adopted in this embodiment, both the protrusion 81 and the protrusion 82 may be set to be high in the arrangement shown in FIG. 3 through FIG. 5 (for example, when the liquid-crystal layer 50 is as thick as 3 μm, the height of the protrusion 81 is 0.5 μm, and the height of the protrusion 82 is 0.5 μm).

In this embodiment, the polarity of the driving voltage may be inverted every row, or every two adjacent rows, or every plural number of adjacent rows in the 1H alternating drive method. Similarly, the polarity of the driving voltage may be inverted every column, or every two adjacent columns, or every plural number of adjacent columns in the 1S alternating drive method. In the dot alternating drive method, the polarity of the driving voltage may be inverted every block composed of a plurality of pixel electrodes.

In the above-referenced embodiment, in the pixel switching TFT 30, the channel region 1a', the lightly doped source region 1b and the lightly doped drain region 1c, the heavily doped source region 1d and the heavily doped drain region 1e are fabricated of a semiconductor material, and preferably have a polycrystal structure or a monocrystal structure. In the above-referenced embodiment, the pixel switching TFT 30 preferably has an LDD structure as shown in FIG. 3, but may have an offset structure in which no impurity ion implantation is performed on the lightly doped source region 1b and the lightly doped drain region 1c, or may have a self-aligned type TFT in which an impurity ion of a high dose is implanted with the gate electrode formed of a portion of the scanning line 3a being used as a mask, to form heavily doped source and drain regions in a self-alignment process. In this embodiment, the gate electrode of the pixel switching TFT 30 is a single gate structure in which a single gate is interposed between the heavily doped source region 1d and the heavily doped drain region 1e, but alternatively, more than one gate electrode may be interposed therebetween. With at least dual gates or triple gates employed in a TFT, leakage currents in junctions between the channel region and the source region and between the channel region and the drain region are prevented, and thereby a current during off period is reduced.

The present invention may not only be applied in a projection-type liquid-crystal device and a transmissive-type liquid-crystal device, but also in a reflective-type liquid-crystal device, and the effect of reducing the orientation defect of the liquid crystal provided by the above-referenced embodiment is equally enjoyed. (Manufacturing process)

A manufacturing process of the TFT array substrate constituting the electrooptical device in accordance with the embodiment having the above-referenced structure is now discussed, referring to FIGS. 8(a)-FIG. 9(e). FIGS. 8(a)–8(e) are process diagrams showing the layers of the TFT array substrate, corresponding to the cross section B–B' in FIG. 2, as shown in FIG. 4, and FIGS. 9(a)–9(e) are process diagrams showing the layers of the TFT array substrate, corresponding to the cross section C–C' in FIG. 2, as shown in FIG. 5.

Referring to a step (a) of FIG. 8 and FIG. 9, formed on the TFT array substrate 10, such as a quartz substrate, a hard glass substrate, or a silicon substrate, is an underlying insulating layer 12 which has a thickness within a range from 500 to 2000 nm, and is fabricated of a silicate glass film, such as NSG, PSG, BSG, or BPSG, a silicon nitride film, or a silicon oxide film, using TEOS (tetraethyl orthosilicate) gas, TEB (triethyl borate) gas, or TMOP (trimethyl phosphate) gas or the like through an atmospheric CVD method or a reduced pressure CVD method. Next, a semiconductor layer is formed on the underlying insulating layer 12. The semiconductor layer has a polycrystal structure or a monocrystal structure. For the polycrystal semiconductor layer, an amorphous silicon layer is formed on top of the underlying insulating layer 12 using a reduced pressure CVD and is subjected to an annealing process at approximately 600° C., and the polysilicon layer is thus epitaxially grown in solid phase. Alternatively, rather than through the amorphous silicon layer, a polysilicon susbstrate is directly formed through a reduced pressure CVD. When the monocrystal semiconductor layer is formed, a layer stacking method may be employed in which the monocrystal layer side of the substrate is thinned after stacking a monocrystal layer onto a support substrate. Silicon is preferably used as a monocrystal semiconductor. Any material may be employed as long as it exhibits a semiconductor property and forms a switching element. Such a structure having a thin monocrystal silicon layer deposited on an insulator is particularly referred to as SOI (Silicon on Insulator). This technique is now referred to as a layer stacking method and a resulting substrate assembly is referred to as a layer stacked SOI substrate. The layer stacking method preferably employs known hydrogen ion implantation and annealing technique as a technique to form a monocrystal silicon layer having an excellently uniform thickness. A monocrystal silicon substrate to be thinned is implanted with hydrogen ions to a predetermined implantation depth, and a TFT array substrate is stacked onto this monocrystal silicon substrate. The laminate is then subjected to an annealing process at a temperature within a range from 500° C. to 600° C. In this way, an extremely thin monocrystal layer is left on the TFT array substrate with the monocrystal silicon substrate separated. The resulting monocrystal silicon layer suffers less from defects, and has a high quality and a high thickness uniformity.

As another technique for forming a monocrystal silicon layer having an excellent thickness uniformity, a known technique may be used in which a monocrystal silicon layer epitaxially grown on a porous silicon layer is transferred to an array substrate. The monocrystal silicon layer is epitaxially grown on the silicon substrate, the surface of which has become porous through electrolytic polishing. This is stacked onto the array substrate, and the fragile porous layer is physically destructed by water jet, for example. In this way, the silicon substrate and the monocrystal silicon layer are separated. After the separation, the remnant of the porous silicon residing on the surface of the epitaxially grown monocrystal silicon layer is removed by an etchant containing HF/H2O2 at a high selectivity ratio. In this way, the monocrystal silicon layer transferred onto the array substrate suffers less from defects, and has a high quality and a high thickness uniformity.

By subjecting the polysilicon layer or the monocrystal silicon layer to a photolithographic process, an etching process, etc., the semiconductor layer 1a having a predetermined pattern including the pixel electrode side storage capacitor electrode 1f shown in FIG. 2 is formed.

Through a thermal oxidation, the thin insulator layer 2, including the dielectric layer for the storage capacitor, is formed along with the gate insulator of the TFT 30 shown in FIG. 3 through FIG. 5. As a result, the thickness of the semiconductor layer 1a falls within a range of about 30 to 150 nm, and preferably within a range of about 35 to 50 nm, and the thickness of the thin insulator layer 2 falls within a range of about 20 to 150 nm, and preferably within a range of 30 to 100 nm. A polysilicon layer having a thickness within a range of about 100 to 500 nm is deposited through a reduced pressure CVD process, and P (phosphorus) is thermally diffused to turn the polysilicon layer into a conductive layer, and then through a photolithographic process, an etching process, etc., the scanning line 3a and the capacitive line 3b having predetermined patterns shown in FIG. 2 are produced. The scanning line 3a and the capacitive line 3b may be fabricated of a metal alloy of a refractory metal or a metal silicide, or may be a multilayer wiring in combination with a polysilicon film. Next, doping impurity ions at two phases of a low dose and a high dose produces the pixel switching TFT 30 having the LDD structure including the lightly doped source region 1b and the lightly doped drain region 1c, and the heavily doped source region 1d and the heavily doped drain region 1e.

In parallel with the step (a) of FIG. 8 and FIG. 9, TFTs constituting peripheral circuits such a data line drive circuit and a scanning line drive circuit may be formed on the periphery of the TFT array substrate 10.

Referring to a step (b) of FIG. 8 and FIG. 9, the first interlayer insulator 4, fabricated of a silicate glass film such as NSG, PSG, BSG, or BPSG, a silicon nitride film, or a silicon oxide film, is produced using TEOS gas through an atmospheric CVD process or a reduced pressure CVD process to cover the laminate of the scanning line 3a, the capacitive line 3b, the thin insulator layer 2 and the underlying insulating layer 12. The first interlayer insulator 4 has a thickness within a range of 1000 to 2000 nm. In parallel with or immediately subsequent to this calcination process, an annealing process may be performed at about 1000° C. to activate the semiconductor layer 1a. The contact hole 5 for electrically connecting the data line 6a shown in FIG. 3 to the heavily doped source region 1d of the semiconductor layer 1a is drilled in the first interlayer insulator 4 and the thin insulator layer 2, and contact holes for connecting the scanning line 3a and the capacitive line 3b to unshown lines in the area peripheral to the substrate are also drilled at the same step as that for the contact hole 5. In succession, a low-resistance metal film of Al or the like and a metal silicide film are deposited to a thickness within a range of about 100 to 500 nm on the first interlayer insulator 4 through a sputtering process, and the data line 6a is formed through a photolithographic process, an etching process, and the like.

Referring to a step (c) of FIG. 8 and FIG. 9, the second interlayer insulator 7 is deposited on the data line 6a. Referring to FIG. 3, the contact hole 8 for electrically connecting the pixel electrode 9a to the heavily doped drain region 1e is formed through a dry etching process such as a reactive ion etching or a reactive ion beam etching, or a wet etching process. Formed on the second interlayer insulator 7 in succession is an insulator to be planarized, fabricated of a silicate glass film such as NSG, PSG, BSG, or BPSG, a silicon nitride film, or a silicon oxide film, which is produced using TEOS gas through an atmospheric CVD process or a reduced pressure CVD process. At this point, the insulator to be planarized still suffers from surface irregularity reflecting the presence of the scanning line 3a, the capacitive line 3b and the data line 6a present therebeneath. By subjecting the insulator having the surface irregularity to the CPM process, the planarized layer 80c having the surface thereof at the level LV is formed. The insulator to be planarized is set to be so thick that the level of the surface lowest prior to the CMP process becomes higher in level than the highest point of the second interlayer insulator 7 beneath the insulator through the CMP process. Through the CMP process, the insulator is polished until its lowest point is polished, and is further polished to the level LV but to the degree that the second interlayer insulator 7 and at least the data line 6a are not exposed. The surface of the insulator is fully planarized to the level LV. Specifically, in the CMP process, the surface of the planarizing layer 80c is polished by putting a polishing pad fixed on a polishing plate into contact with the surface of the substrate fixed on a spindle with a slurry containing silica (a chemical polishing fluid) flowing thereon. The polishing step is stopped by setting a timer or forming a stopper layer in a predetermined position on the TFT array substrate 10 before the second interlayer insulator 7 or the data line 6a is exposed. As a result, the planarizing layer 80c, the surface of which is planarized at the level LV, is completed. In this case, the detection of the surface of the stopper layer may be performed by a friction detection method in which a friction coefficient is detected when the stopper layer is exposed, by a vibration detection method in which a vibration is detected which is generated when the stopper layer is exposed, or by an optical detection method in which a change in a reflected light quantity is detected which is generated when the stopper layer is exposed.

Referring to a step (d) shown in FIG. 8 and FIG. 9, the planarizing layer 80c is subjected to the photolithographic process and the etching process to etch away the areas other than the protrusion 81 and the protrusion 82. As a result, the protrusion 81 and the protrusion 82 are formed. The surface of the third interlayer insulator 80, other than the protrusion 81 and the protrusion 82, is thus planarized in accordance with uniform etching characteristics. To form protrusion 81 and the protrusion 82 at the same height, the two protrusions may be concurrently formed. To form the protrusion 81 and the protrusion 82 at different heights, the two protrusions may be separately etched. The etching process may be performed so that the protrusion 82 becomes as high as 0.5 Wm and the protrusion 81 becomes as high as 0.35 μm when the liquid-crystal layer 50 has a thickness of 3 μm, for example. The side wall of the protrusion 81 and the protrusion 82 may be moderately inclined depending on whether the wet etching only or the dry etching and wet etching in combination are performed.

In the step (d), the photolithographic process is preferably performed using the same mask for the wiring pattern of the scanning line 3a and the data line 6a used in the step (a) or the step (b). The manufacturing cost is reduced, compared with the case in which dedicated masks are employed. Although the mask is shared, the width of the wiring and the width of the protrusion are made different by adjusting the exposure level.

Referring to a step (e) shown in FIG. 8 and FIG. 9, a transparent, electrically conductive layer such as an ITO layer is deposited to a thickness within a range of about 50 to 200 nm on the third interlayer insulator 80 using a sputtering technique, and the pixel electrode 9a is formed through a photolithographic process, an etching process, and the like. When the electrooptic device is used as a reflective type, the pixel electrode 9a may be made of a highly opaque material such as Al. The alignment layer 16 is formed on the pixel electrode 9a. Preferably, as already discussed, the rubbing process is performed on the alignment layer 16 in a direction parallel with the step of a larger protrusion 82.

In accordance with the manufacturing method of this embodiment, the planarized layer 80c is planarized using the CMP process after the formation of the second interlayer insulator 7. The entire surface of the laminate is entirely planarized within the image display area, and then is subjected to the etching process to form the protrusion 81 and the protrusion 82. The accuracies of the height, the shape and dimensions of the protrusion 81 and the protrusion 82 are substantially enhanced. The protrusion 81 and the protrusion 82 in the generation area of the transverse electric field substantially reduce the orientation defects of the liquid crystal due to the transverse electric field. A highly reliable liquid-crystal device thus relatively easily results.

Figure 10A:
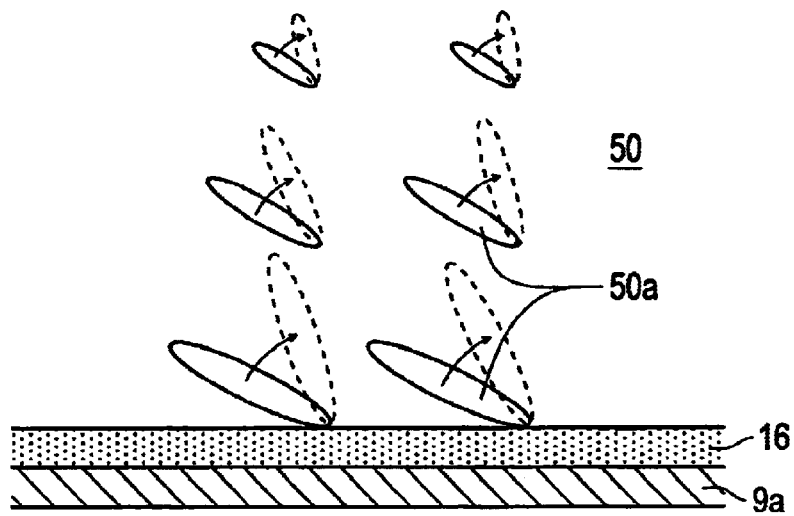
FIGS. 10(a)–10(c) are side views diagrammatically showing the relationship between the inclination of a step of protrusion and the orientation state of liquid-crystal molecules in the electrooptical device of the embodiment.
Figure 10B:
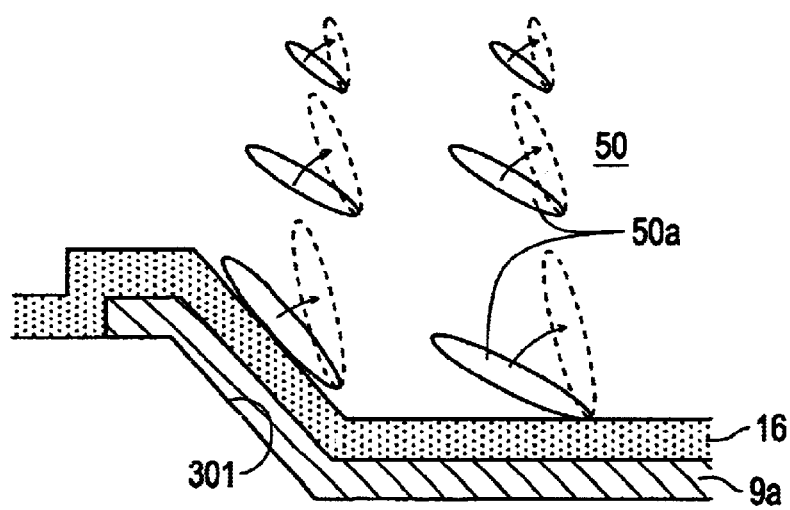
Figure 10C:
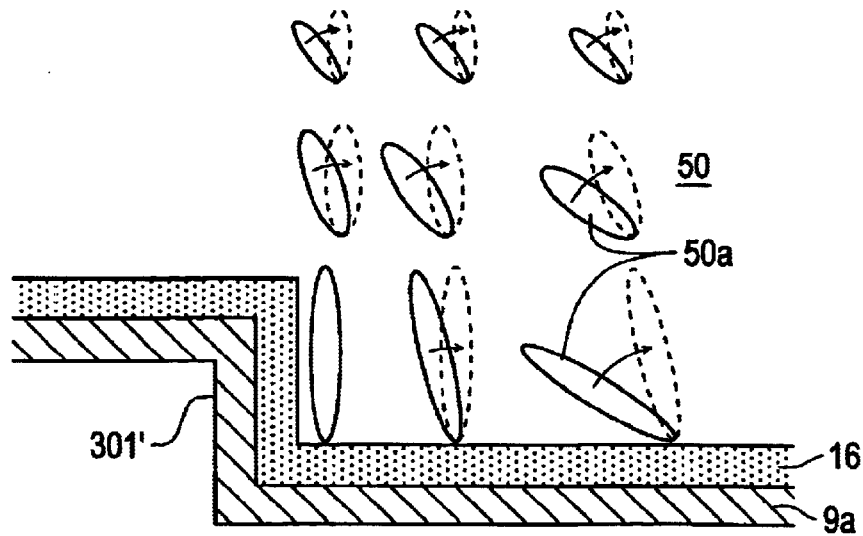

The relationship between the inclination of the side wall of the protrusion 81 and the protrusion 82 and the rubbing direction is now discussed, referring to FIGS. 10(*a*)–10(*c*).

As shown in FIG. 10(*a*), the liquid-crystal molecules 50*a* of the liquid crystal 50 take a predetermined alignment state on the alignment layer 16 which has been subjected to a rubbing process in a lateral direction for a predetermined pretilt. The liquid-crystal molecules 50*a* move to positions represented by broken lines in response to an electric field responsive to a video signal.

Referring to FIG. 10(*b*), the liquid-crystal molecules 50*a* of the liquid crystal 50 are disturbed in alignment at an inclination if a protrusion is beneath the alignment layer 16 that results in inclination perpendicular to the rubbing direction. The disturbance in the orientation state of the liquid-crystal molecules 50*a* becomes pronounced if the inclination is steep as shown in FIG. 10(*c*).

In the etching process illustrated in the step (d) shown in FIG. 8 and FIG. 9, the inclination of the step of the protrusion 81 and the protrusion 82 is made moderate by performing the wet etching process for forming the protrusion 81 and the protrusion 82, or by performing a combination of the drying etching and the wet etching for forming the protrusion 81 and the protrusion 82. With the moderate inclination of the step, the orientation defect of the liquid-crystal molecules 50*a* due to the step is advantageously reduced. Given the same step, the disturbance in the orientation state of the liquid-crystal molecules 50*a* due to the step is reduced if the rubbing process is performed in a direction parallel to the step. In this embodiment, the rubbing process is advantageously performed on the alignment layer 16 of the TFT array substrate 10 in a direction parallel to the step of the protrusion 81 or the protrusion 82 in the grid configuration, whichever is the higher. More advantageously, the rubbing process is performed along the step of the striped protrusion formed in only the area where the transverse electric field is generated as already discussed.

(Modifications)

Figure 11:
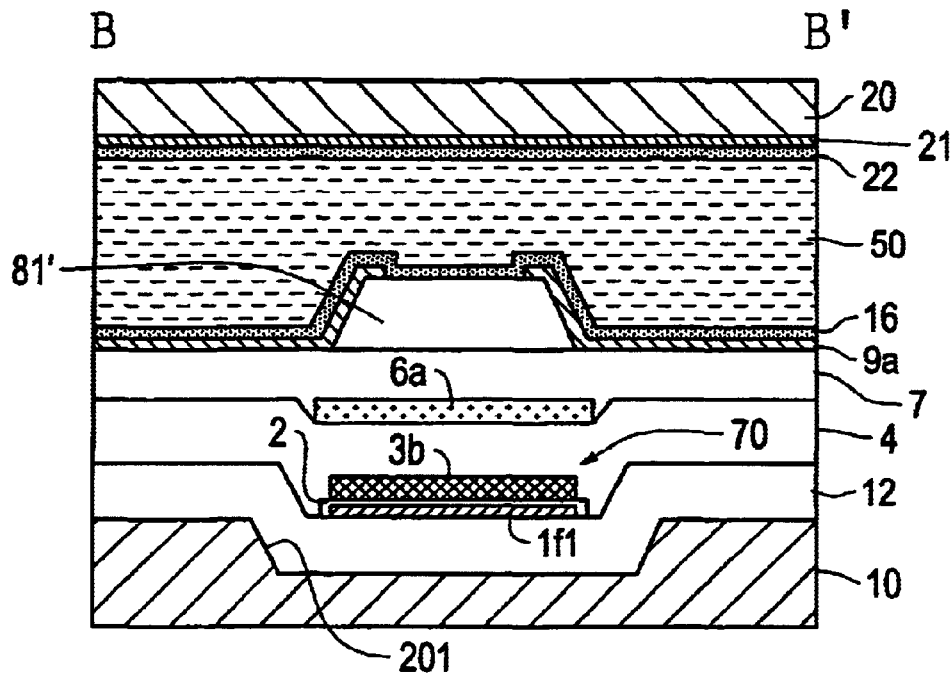
FIG. 11 is a cross-sectional view of a modification taken along plane B–B' in FIG. 2.
Figure 12:
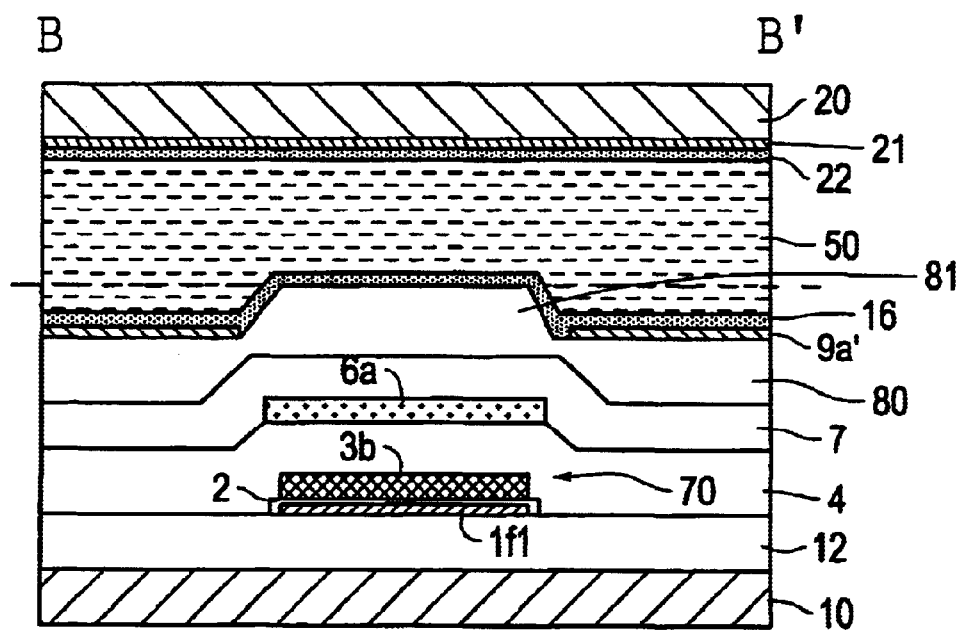
FIG. 12 is a cross-sectional view of another modification taken along plane B–B' in FIG. 2.
Figure 13:
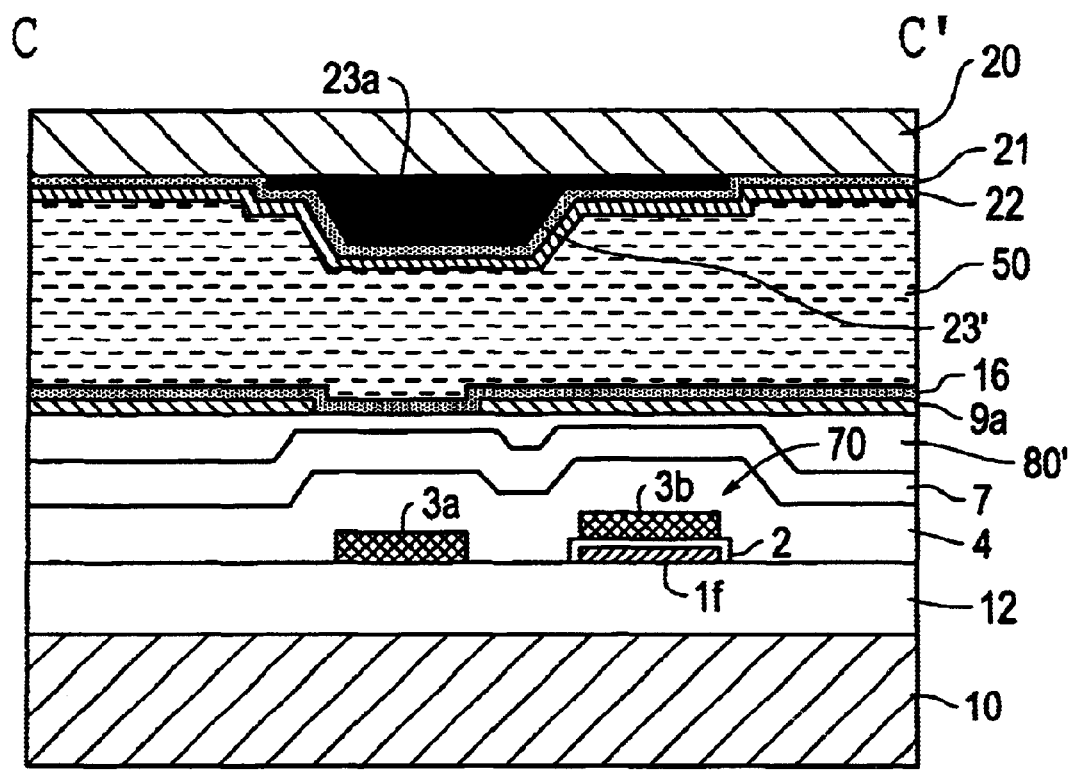
FIG. 13 is a cross-sectional view of yet another modification taken along plane C–C' in FIG. 2.

Modifications of the above-referenced embodiments are now discussed, referring to FIG. 11 through FIG. 13. FIG. 11 is a cross-sectional view of a modification, similar to FIG. 4 taken along plane B–B' in FIG. 2. FIG. 12 is a cross-sectional view of another modification, similar to FIG. 4 taken along plane B–B' in FIG. 2. FIG. 13 is a cross-sectional view of yet another modification, similar to FIG. 5 taken along plane C–C' in FIG. 2.

In the modification shown in FIG. 11, a groove 201 is initially formed, through the etching process or the like, in the TFT array substrate 10 in the area corresponding to the capacitive line 3*b* and the data line 6*a*, instead of planarizing the third interlayer insulator 80 through the CMP process in the embodiment shown in FIG. 4. By embedding the capacitive line 3*b*, the data line 6*a*, etc. in the groove 201, the top surface of the laminate of the TFT array substrate 10 is planarized when the second interlayer insulator 7 is formed. A protrusion 81' is formed on the second interlayer insulator 7 that has been positively planarized, through the photolithographic process and the etching process. Accuracies of the height, the shape and the dimensions of the protrusion 81' are high. In this modification, the groove 201 may be formed in stripes in the direction of the data line 6*a* or in the direction of the scanning line 3*a*, or may be formed in a grid configuration in the directions of the data line 6*a* and the scanning line 3*a*.

In the modification shown in FIG. 12, the protrusion 81 and the pixel electrode 9*a* are laid out so that the edge of the pixel electrode 9*a* abuts the skirt of the protrusion 81, instead of reaching the top of the protrusion 81 in the embodiment shown in FIG. 4. This arrangement still provides the effect of weakening the transverse electric field with the presence of the protrusion 81 fabricated of the insulator, and the effect of reducing the influence of the transverse electric field to the liquid-crystal layer 50 with the liquid crystal replaced by the protrusion 81 in the transverse electric field affected area.

In the modification shown in FIG. 13, a protrusion 23*a* is formed on the counter substrate 20 in an area extending along the scanning line 3*a* or in a grid configuration in a plan view, instead of forming the protrusion 82 on the TFT array substrate in the embodiment shown in FIG. 5. The third interlayer insulator 80' on the TFT array substrate 10 is planarized through the CMP process. Even with the protrusion 23*a* arranged on the counter substrate, the longitudinal electric field is relatively intensified in the generation area of the transverse electric field, and the adverse effect of the transverse electric field is alleviated. When the protrusion 23*a* is arranged on the counter substrate 20 in this embodiment, the protrusion 81 or the protrusion 82 on the TFT array substrate 10 may be dispensed with. Alternatively, together with the protrusion 23*a* on the counter substrate 20, the protrusion 81 and the protrusion 82 may be partly or entirely arranged on the TFT array substrate 10. For example, a protrusion may be arranged on the TFT array substrate 10 in a direction along the scanning line 3*a*, while a protrusion may be arranged on the counter substrate 20 in a direction along the data line 6*a*. Conversely, a protrusion may be arranged on the counter substrate 20 in a direction along the scanning line 3*a*, while a protrusion may be arranged on the TFT array substrate 10 in a direction along the data line 6*a*. Generally speaking, the direction of the rubbing process in the alignment layer 16 on the TFT array substrate 10 and the direction of the rubbing process in the alignment layer 22 on the counter substrate 20 are not the same (for example, they are perpendicular to each other). For this reason, the striped protrusion is formed on the TFT array substrate 10 in one direction while the striped protrusion is formed on the counter substrate 20 in a direction perpendicular to the first direction. The rubbing process is thus performed in a direction parallel to the step of the protrusion on the alignment layer 16 on the TFT array substrate 10, while the rubbing process is performed on the alignment layer 22 in parallel with the step of the protrusion on the counter substrate 20. This arrangement reduces the adverse effect of the transverse electric field with the protrusion while reducing the malfunction of the electrooptical material due to the step of the protrusion. If the protrusion is arranged on the counter substrate 20 by arranging a thick light shield layer 23 as in this modification, the manufacturing process and the structure of the electrooptical device are simple compared with the case in which a dedicated layer is used for the protrusion.

Referring to the step (c) shown in FIG. 8 and FIG. 9, the planarizing layer 80*c* is planarized through the CMP process. Alternatively, the planarizing layer 80*c* is formed by applying the flowable insulator material using a spin coating technique.

(General Structure of the Electrooptic Device)

Figure 14:
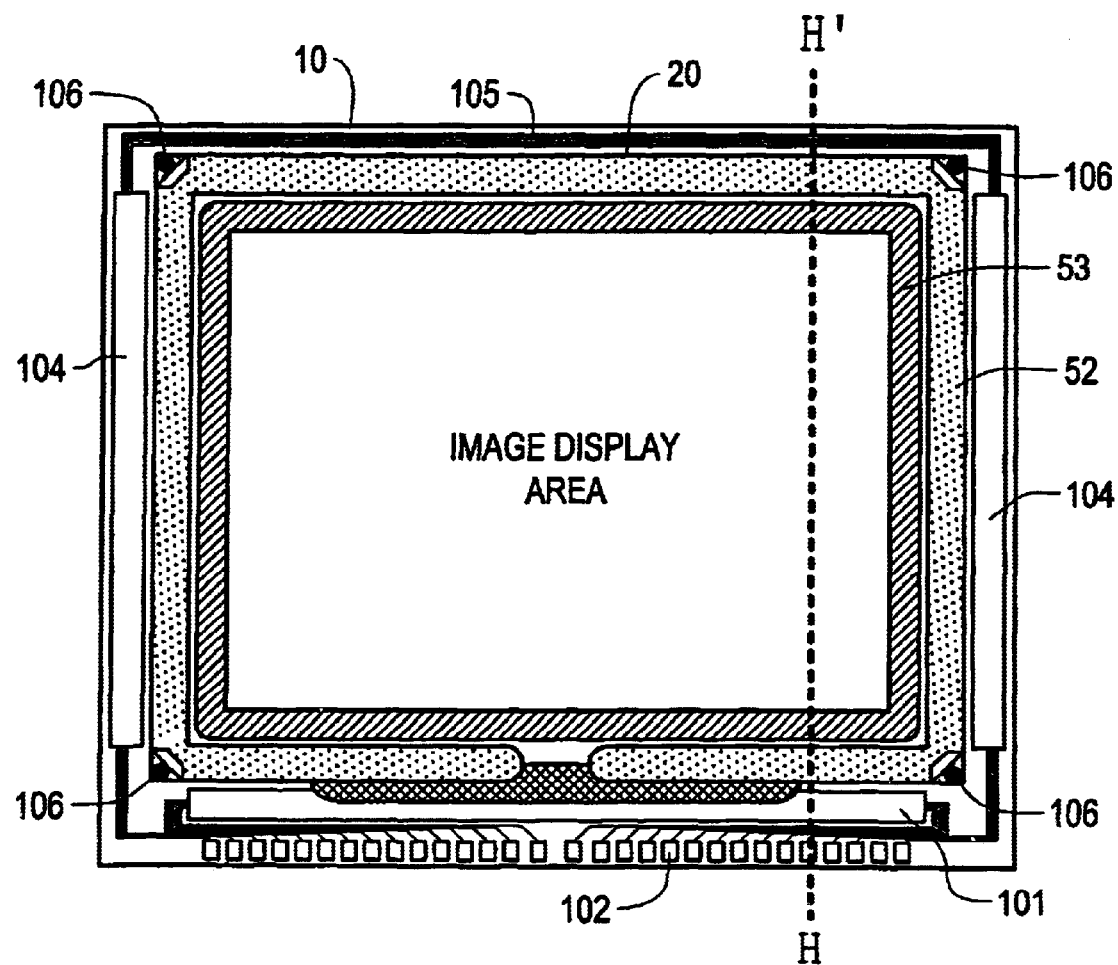
FIG. 14 is a plan view of the TFT array substrate with components arranged thereon, viewed from a counter substrate in the electrooptic device of each embodiment.
Figure 15:
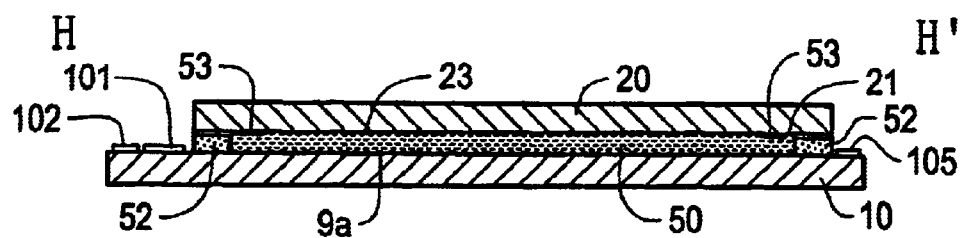
FIG. 15 is a cross-sectional view taken along plane H–H' in FIG. 14.

The general structure of the electrooptic device of the above embodiments is now discussed, referring to FIG. 14 and FIG. 15. FIG. 14 is a plan view of the TFT array substrate 10 with components arranged thereon, viewed from the counter substrate 20, and FIG. 15 is a cross-sectional view taken along plane H–H' in FIG. 14.

Referring to FIG. 14, the TFT array substrate 10 is provided with a sealing material 52 along the edge thereof, and a frame 53, fabricated of the same material as that of the light shield layer 23, or fabricated of a different material, extends along the internal edge of the sealing material 52, defining the peripheral outline of an image display area. A data line drive circuit 101 that drives the data line 6a by supplying the data line 6a with a video signal at a predetermined timing, and external circuit interconnect terminals 102 are arranged on one side of the TFT array substrate 10, external to the area of the sealing material 52, and scanning line drive circuits 104 that drive the scanning line 3a by supplying the scanning line 3a with a scanning signal at a predetermined timing is arranged on two sides of the first side of the TFT array substrate 10. If a delay in the scanning signal supplied to the scanning line 3a presents no problem, the scanning line drive circuit 104 may be mounted on only one side. Data line drive circuits 101 may be arranged on both sides of the image display area. Arranged on the remaining one side of the image display area of the TFT array substrate 10 is a plurality of lines 105 that connect the scanning line drive circuits 104 mounted on both sides of the image display area. A conductive material 106 for electrically connecting the TFT array substrate 10 to the counter substrate 20 is mounted at least one corner of the counter substrate 20. Referring to FIG. 15, the counter substrate 20 having almost the same outline as that of the sealing material 52 shown in FIG. 14 is bonded to the TFT array substrate 10 through the sealing material 52.

Besides the data line drive circuits 101 and the scanning line drive circuit 104, the TFT array substrate 10 may be provided with a sampling circuit that applies the video signal to the plurality of the data lines 6a at a predetermined timing, a precharge circuit that supplies a precharge signal at a predetermined voltage level to the plurality of the data lines 6a prior to the application of the video signal, and a test circuit that checks the quality and defects of the electrooptic device in the middle of the production or at the shipment thereof.

In each embodiment described with reference to FIG. 1 through FIG. 15, the data line drive circuit 101 and the scanning line drive circuit 104 may be electrically and mechanically connected to a driver LS1 mounted on a TAB (Tape Automated Bonding) board, through an anisotropically electrically conductive film arranged about the TFT array substrate 10, rather than mounting the data line drive circuit 101 and the scanning line drive circuit 104 on the TFT array substrate 10. Arranged on the light incident side of the counter substrate 20 and the light exit side of the TFT array substrate 10 are respectively polarizer films, retardation films, and polarizers in predetermined directions to work with operation modes such as a TN mode, a VA mode, a PDLC (Polymer Dispersed Liquid Crystal) mode, and normally white mode/normally black modes.

When the electrooptic device of each of the above embodiments is incorporated in a projector, three panels of the electrooptic devices are used as RGB light valves, and each light valve receives the respective color light separated through RGB color separating dichroic mirrors. In each of the above embodiments, the counter substrate 20 is equipped with no color filter. Optionally, an RGB color filter in a predetermined area facing the pixel electrode 9a may be arranged on the counter substrate 20 along with a protective film. In this way, the electrooptic device of each embodiment finds applications in a direct viewing or reflective type color electrooptic device, besides the liquid-crystal projector.

As described in Japanese Unexamined Patent Application Publication No. 9-127497, Japanese Examined Patent Application Publication No. 3-52611, Japanese Unexamined Patent Application Publication No. 3-125123, and Japanese Unexamined Patent Application Publication No. 8-171101, and in each of the above embodiments, a light shield layer fabricated of a refractory metal may be mounted on the TFT array substrate 10 in a position facing the pixel switching TFT 30 (i.e., beneath the TFT). The light shield layer mounted beneath the TFT 30 prevents a rear surface reflection (returning light) from the TFT array substrate 10, or prevents projection light coming in from another electrooptical device penetrating a prism from entering the TFT 30 of the electrooptic device when a plurality of liquid-crystal devices are combined through prisms or the like. Microlenses may be arranged on the counter substrate 20 on a one microlens to one pixel basis. A color filter layer may be arranged on the underside of the RGB pixel electrode 9a on the TFT array substrate 10 using color resist. In this way, condensation efficiency of the incident light is increased, and an electrooptic device providing a bright image results. By laminating interference layers having different refractive indexes on the counter substrate 20, a dichroic filter for creating the RGB colors is formed taking advantage of interference of light. The counter substrate with such a dichroic filter equipped makes an even brighter electrooptic device.

The present invention is not limited to the above embodiments, and various changes and modifications may be effected without departing from the spirit of the invention and the scope of the appended claims, and the electrooptical device incorporating such changes and modifications and the manufacturing method therefor fall within the scope of the present invention.

What is claimed is:

1. A method for manufacturing an electrooptical device which includes a first substrate, a second substrate, and an electrooptical material interposed between the first and second substrates, the first substrate including a plurality of two-dimensionally arranged pixel electrodes, including pixel electrodes of a first group driven in a periodic polarity reversal manner with a first period and pixel electrodes of a second group, driven in a periodic polarity reversal manner with a second period which is complementary to the first period, and the second substrate including a counter electrode arranged to face the plurality of pixel electrodes, the manufacturing method comprising:

forming a pattern that includes a wiring that drives the pixel electrodes, and elements on the first substrate;

planarizing a top surface of a laminate on the first substrate including the pattern;

forming a protrusion in an area in a spacing between pixel electrodes adjacent in plan view, by subjecting the planarized surface to photolithographic and etching processes, including forming the protrusion in a grid configuration running in the spacing between the adjacent pixel electrodes so that a protrusion having a first height is formed between adjacent pixel electrodes which are included in different pixel electrode groups, and is formed at neighborhood of contact holes formed between the elements and the pixel electrodes, and so that a protrusion having a second height, lower than the first height, is formed between adjacent pixels which are included in the same pixel electrode group; and fabricating the plurality of pixel electrode.

2. The method for manufacturing an electrooptical device according to claim 1, the planarizing step including:

depositing an insulator having a predetermined thickness; and forming a planarized insulator by subjecting the insulator having the predetermined thickness to a CMP (Chemical Mechanical Polishing) process.

3. The method for manufacturing an electrooptical device according to claim 1, the planarizing step including forming a planarized insulator by applying a flowable insulator material.

4. The method for manufacturing an electrooptical device according to claim 1, the step of forming a pattern includes fabricating an element, that drives the pixel electrode formed on the first substrate, of a monocrystal semiconductor layer based on a layer stacking SOI (Silicon On Insulator) technique.

5. The method for manufacturing an electrooptical device according to claim 1, the planarizing step including initially forming a groove into which the pattern is embedded.

6. The method for manufacturing an electrooptical device according to claim 1, further including:

forming an alignment layer on the plurality of pixel electrodes; and subjecting the alignment layer to a rubbing process in a direction parallel to a step of the protrusion having the first height.

7. A method for manufacturing an electrooptical device which includes a first substrate, a second substrate, and an electrooptical material interposed between the first and second substrates, the first substrate including a plurality of two-dimensionally arranged pixel electrodes, including pixel electrodes of a first group driven in a periodic polarity reversal manner with a first period and pixel electrodes of a second group driven in a periodic polarity reversal manner with a second period which is complementary to the first period, and the second substrate including a counter electrode arranged to face the plurality of pixel electrodes, the manufacturing method comprising:

forming a pattern that includes a wiring that drives the pixel electrodes, and elements on the first substrate;

planarizing a top surface of a laminate on the first substrate including the pattern;

forming a protrusion in an area in a spacing between pixel electrodes adjacent in plan view, by subjecting the planarized surface to photolithographic and etching processes; and fabricating the plurality of pixel electrodes, the step of forming the protrusion including forming striped protrusions in plan view by forming the protrusion between the adjacent pixel electrodes which are included in the different pixel electrode groups, and forming no protrusions between the adjacent pixel electrodes which are included in the same pixel electrode group.

8. The method for manufacturing an electrooptical device according to claim 7, further including:

forming an alignment layer on the plurality of pixel electrodes; and subjecting the alignment layer to a rubbing process in a direction parallel to a step of the protrusion.

9. The method for manufacturing an electrooptical device according to claim 1, the step of forming the protrusion including forming the protrusion using a wet etching process.

10. A method for manufacturing an electrooptical device which includes a first substrate, a second substrate, and an electrooptical material interposed between the first and second substrates, the first substrate including a plurality of two-dimensionally arranged pixel electrodes, including pixel electrodes of a first group driven in a periodic polarity reversal manner with a first period and pixel electrodes of a second group driven in a periodic polarity reversal manner with a second period which is complementary to the first period, and the second substrate including a counter electrode arranged to face the plurality of pixel electrodes, the manufacturing method comprising:

forming a pattern that includes a wiring that drives the pixel electrodes, and elements on the first substrate;

planarizing a top surface of a laminate on the first substrate including the pattern;

forming a protrusion in an area in a spacing between pixel electrodes adjacent in plan view, by subjecting the planarized surface to photolithographic and etching processes; and fabricating the plurality of pixel electrodes, wherein the step of forming the protrusion includes forming the protrusion through a dry etching process and a wet etching process subsequent to the dry etching process.

11. The method for manufacturing an electrooptical device according to claim 1, the step of forming the protrusion including performing a photolithographic process which uses a mask that is used to produce the wiring during the step of forming the pattern.

12. A method for manufacturing an electrooptical device which includes a first substrate, a second substrate, and an electrooptical material interposed between the first and second substrates, the first substrate including a plurality of two-dimensionally arranged pixel electrodes, including pixel electrodes of a first group driven in a periodic polarity reversal manner with a first period and pixel electrodes of a second group driven in a periodic polarity reversal manner with a second period which is complementary to the first period, and the second substrate including a counter electrode arranged to face the plurality of pixel electrodes, the manufacturing method comprising:

forming a pattern that includes a wiring that drives the pixel electrodes, and elements on the first substrate;

planarizing a top surface of a laminate on the first substrate including the pattern;

forming a protrusion in an area in a spacing between pixel electrodes adjacent in plan view, by subjecting the planarized surface to photolithographic and etching processes; and fabricating the plurality of pixel electrodes, wherein the step of forming the protrusion includes forming the protrusion having a width different from a width of the wiring by using the mask and by adjusting an exposure level.

13. The method for manufacturing an electrooptical device according to claim 1, further including forming another protrusion on the second substrate facing the spacing between the adjacent pixel electrodes.

14. A method for manufacturing an electrooptical device which includes a first substrate, a second substrate, and an electrooptical material interposed between the first and second substrates, the first substrate including a plurality of two-dimensionally arranged pixel electrodes, including pixel electrodes of a first group driven in a periodic polarity reversal manner with a first period and pixel electrodes of a second group driven in a periodic polarity reversal manner with a second period which is complementary to the first period, and the second substrate including a counter electrode arranged to face the plurality of pixel electrodes, the manufacturing method comprising:

forming a pattern that includes a wiring that drives the pixel electrodes, and elements on the first substrate;

planarizing a top surface of a laminate on the first substrate including the pattern;

forming a protrusion in an area in a spacing between pixel electrodes adjacent in plan view, by subjecting the planarized surface to photolithographic and etching processes;

fabricating the plurality of pixel electrodes;

forming another protrusion on the second substrate facing the spacing between the adjacent pixel electrodes;

forming an alignment layer on the second substrate; and subjecting the alignment layer to a rubbing process in a direction parallel to a step of the other protrusion.

15. The method for manufacturing an electrooptical device according to claim 13, further including forming a light shield layer on the second substrate facing the spacing between the adjacent pixel electrodes, the step of forming another protrusion on the second substrate including forming the another protrusion using the presence of the light shield layer.

16. An electrooptical device, comprising:

a first substrate, the first substrate including a plurality of two-dimensionally arranged pixel electrodes, including pixel electrodes of a first group driven in a periodic polarity reversal manner with a first period, and pixel electrodes of a second group, driven in a periodic polarity reversal manner with a second period which is complementary to the first period, a pattern including a wiring for driving the pixel electrode and an element, and a protrusion that is formed in a spacing between pixel electrodes adjacent in a plan view, by performing a photolithographic process and an etching process onto a planarized top surface of the laminate on the first substrate after the planarization of the top surface of the laminate of the first substrate in a manufacturing process;

a second substrate, the second substrate including a counter substrate facing the plurality of pixel electrodes; and an electrooptical material interposed between the first and second substrates, the protrusion formed in a spacing between pixel electrodes being formed in a grid configuration so that a protrusion having a first height is formed between adjacent pixel electrodes which are included in different pixel electrode groups, and is formed at neighborhood of contact holes formed between the elements and the pixel electrodes, and so that a protrusion having a second height, lower than the first height, is formed between adjacent pixels which are included in the same pixel electrode group.

17. A method for manufacturing an electrooptical device which includes a first substrate, a second substrate, and an electrooptical material interposed between the first and second substrates, the first substrate including a plurality of two-dimensionally arranged pixel electrodes, including pixel electrodes of a first group and pixel electrodes of a second group, and the second substrate including a counter electrode arranged to face the plurality of pixel electrodes, the manufacturing method comprising:

forming a pattern that includes a wiring that drives the pixel electrodes, and elements on the first substrate;

planarizing a top surface of a laminate on the first substrate including the pattern;

forming a protrusion in an area in a spacing between pixel electrodes adjacent in plan view, by subjecting the planarized surface to photolithographic and etching processes; and fabricating the plurality of pixel electrodes, the step of forming the protrusion including forming the protrusion in a grid configuration running in the spacing between the adjacent electrodes so that a protrusion having a first height is formed between adjacent pixel electrodes which are included in different pixel electrode groups, and is formed at neighborhood of contact holes formed between the elements and the pixel electrodes, and so that a protrusion having a second height, lower than the first height, is formed between adjacent pixels which are included in the same pixel electrode group.

* * * * *